United States Patent [19]

Takahara et al.

[11] Patent Number: 4,885,267

[45] Date of Patent: Dec. 5, 1989

[54] PEROVSKITE CERAMIC AND FABRICATION METHOD THEREOF

[75] Inventors: Hideyuki Takahara, Chofu; Kazuo Kiuchi, Tokyo, both of Japan

[73] Assignee: Nippon Telegraph and Telephone Corporation, Tokyo, Japan

[21] Appl. No.: 135,521

[22] PCT Filed: Sep. 2, 1985

[86] PCT No.: PCT/JP85/00490

§ 371 Date: Apr. 17, 1986

§ 102(e) Date: Apr. 17, 1986

[87] PCT Pub. No.: WO86/01497

PCT Pub. Date: Mar. 13, 1986

Related U.S. Application Data

[63] Continuation of Ser. No. 855,745, Apr. 17, 1986, abandoned.

[30] Foreign Application Priority Data

| Sep. 3, 1984 [JP] | Japan | 59-182702 |
| Aug. 12, 1985 [JP] | Japan | 60-175643 |
| Aug. 12, 1985 [JP] | Japan | 60-175644 |

[51] Int. Cl.$^4$ ............................................. C04B 35/26
[52] U.S. Cl. ............................................... 501/134
[58] Field of Search ........................................ 501/134

[56] References Cited

U.S. PATENT DOCUMENTS

4,078,938  3/1978  Yonezawa et al. ............ 252/63.5 X

FOREIGN PATENT DOCUMENTS

| 0110498 | 8/1979 | Japan | 501/134 |
| 0110499 | 8/1979 | Japan | 501/134 |
| 0110500 | 8/1979 | Japan | 501/134 |

*Primary Examiner*—William R. Dixon, Jr.
*Assistant Examiner*—James M. Hunter, Jr.
*Attorney, Agent, or Firm*—Spencer & Frank

[57] ABSTRACT

A perovskite ceramic is prepared by separately preliminarily calcining raw material powders of two kinds of perovskite ceramic materials having mutually different compositions to form two kinds of perovskite ceramic materials having respective high dielectric constants and mutually different Curie temperatures, crushing and mixing the calcined materials at an adequate ratio, and sintering the mixed materials without forming a and change complete solid solution thereof. The two kinds of perovskite ceramic materials have the formula $Pb(Fe_{\frac{2}{3}}W_{\frac{1}{3}})_{x_i}(Fe_{\frac{1}{2}}Nb_{\frac{1}{2}})_{1-x_i}O_3$, wherein in a first kind of perovskite ceramic material $i=1$ and $0.1 \leq x_1 \leq 0.2$, and in a second kind of ceramic perovskite material $i=2$ and $0.5 \leq x_2 \leq 0.9$, the two kinds of perovskite ceramic material coexisting in the mixing ratio $0.5 \leq x_2/(x_1+x_2) \leq 0.8$.

15 Claims, 22 Drawing Sheets

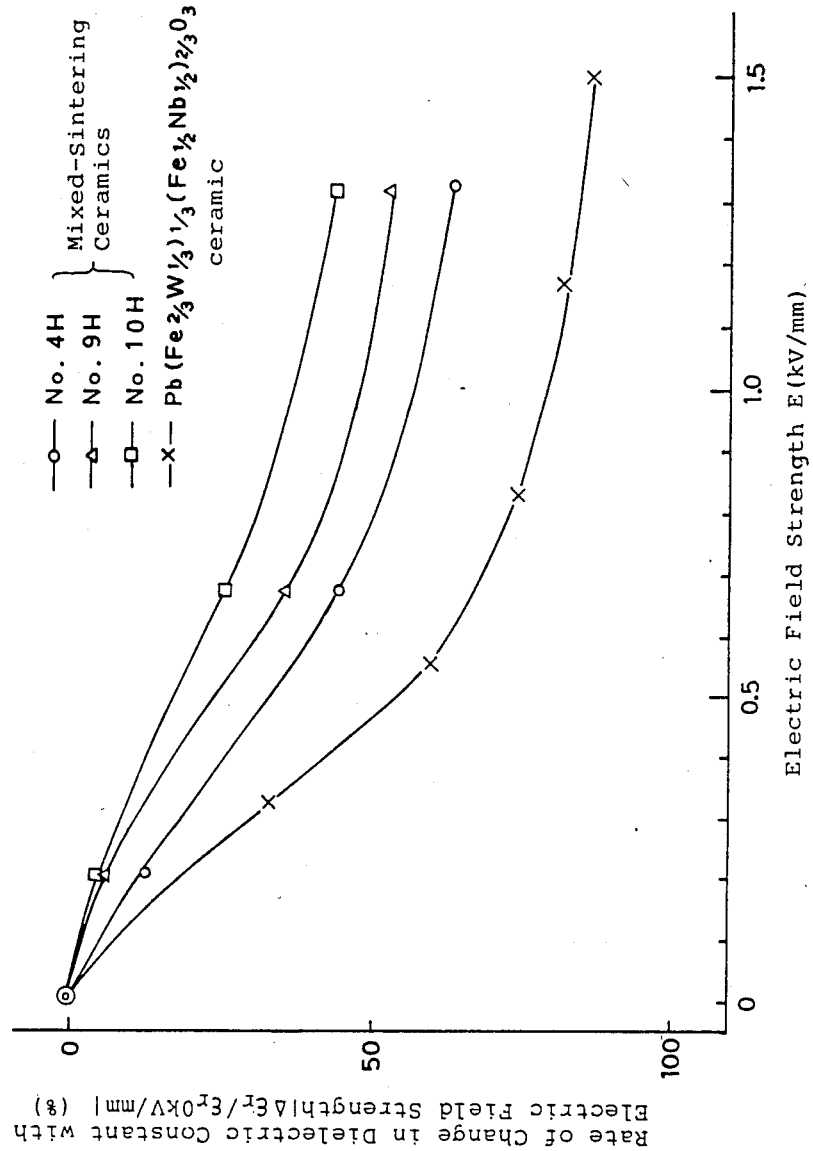

PEROVSKITE CERAMIC AND FABRICATION METHOD THEREOF

This application is a continuation, of application Ser. No 06/855,745, filed Apr. 17th, 1986 aband.

BACKGROUND OF THE INVENTION

1. Field of the Invention

The present invention relates to a perovskite ceramic having a high dielectric constant and small dependences of dielectric constant on the temperature and the electric field strength, which is favorably employed in a ceramic dielectric layer of a small-size ceramic capacitor having a large capacity and small dependences of electrostatic capacity on the temperature and the voltage, and a fabrication method thereof.

2. Background Art

A ceramic capacitor having a large capacity is desired to have small dependences of electrostatic capacity on the temperature and the voltage for facilitating designing of an electric power circuit and stabilizing the circuit characteristics. For this reason, a perovskite ceramic employed in a ceramic dielectric layer of a ceramic capacitor is desired to have a high dielectric constant and small dependences of dielectric constant on the temperature and the electric field strength. On the other hand, in order to attain a large capacity, a sharp peak of dielectric constant accompanying a phase transition of the perovskite ceramic is generally utilized. Thus, the large capacity ceramic capacitor has such a disadvantage that the dependences of dielectric constant on the temperature and the electric field strength may be higher as the dielectric constant is higher. For the purpose of obviating this the defect, intensive investigations have been made for improving the temperature dependence of dielectric constant, while not so many studies have been being made for improving the electric field strength dependence of dielectric constant.

FIG. 1 illustrates a process of preparing a ceramic which has heretofore been practiced for securing an improved dependence of dielectric constant on the temperature. Powders of raw materials are so weighed as to provide a composition ratio of a desired composition, to which a depressor agent is added for improving the temperature dependence of dielectric constant After wet-mixing and drying, calcination is made to effect crystallization of the composition, followed by crushing The crushed composition is subjected to pressing and sintering. Thus, a ceramic is prepared.

The above-mentioned addition of the depressor agent to the composition in the course of weighing dulls the peak of dielectric constant accompanying the phase transition of the crystals, thus providing a small temperature dependence of dielectric constant.

As an instance of an improvement of the temperature dependence of dielectric constant according to the above-mentioned method, Coffeen W. W. reported the results of addition of a metal stannate as the depressor agent to $BaTiO_3$ as a perovskite ceramic material (see J. Amer. Ceram. Soc., Vol. 37, pages 480–489, 1954). According to Coffeen, when a small amount of $Bi_2(SnO_3)_3$ is added to $BaTiO_3$, the temperature dependence of dielectric constant is markedly improved, but the dielectric constant is decreased to about 1,000 or less. On the other hand, when 13 mol % of $PbSnO_3$ is added to $BaTiO_3$, the dielectric constant at room temperature is about 7,000, but the temperature dependence of dielectric constant is large. Okazaki et al. reported that, when $NiSnO_3$ or $La_2O_3.3TiO_2$ is added as the depressor agent to $BaTiO_3$, the ceramic turns to have a smaller temperature dependence of dielectric constant, and explained that the cause therefor may be attributed to formation of two phases in the ceramic (Journal of the Ceramic Society of Japan, Vol. 73, pages 106–112, 1965). However, in the case of the report of Okazaki et al., as low a dielectric constant as a mere 3,000 or less was obtained. Jonker, G. H. reported that two phases, a Ca-rich phase containing a large amount of $CaTiO_3$ and a Ba-rich phase containing a large amount of $BaTiO_3$, are formed in a ceramic of a binary system of $BaTiO_3$ and $CaTiO_3$, resulting in a smaller temperature dependence of dielectric constant (see Philips Tech. Rev., Vol. 117, pages 129–137, 1955). However, since the dielectric constant of $CaTiO_3$ is as low as 130 at room temperature, the maximum value of dielectric constant in the binary ceramic after formation of the two phases is as low as 2,000 or less. Hennings, D. et al. reported that, when $CdBi_2Nb_2O_9$ is added to $BaTiO_3$, a ferroelectric phase and a paraelectric phase are formed in grain cores and grain shells, respectively, of crystalline grains, resulting in a smaller temperature dependence of dielectric constant (J. Amer. Ceram. Soc., Vol. 67, pages 249–254, 1984). In this case, however, the maximum value of dielectric constant is merely about 5,000. Particularly, in the case of a small temperature dependence of dielectric constant, the maximum value of dielectric constant is as low as about 3,000.

As described above, no perovskite ceramics having a high dielectric constant and small dependences of dielectric constant on the temperature and the electric field strength have heretofore been obtained.

Besides, the method comprising addition of a depressor agent requires a search for a specific depressor agent capable of providing a desired dependence of dielectric constant on the temperature in addition to a search for a perovskite ceramic material, and has disadvantages of liability to a decrease in resistivity, a shift of Curie temperature around which a high dielectric constant is exhibited, and/or a decrease in mechanical strength because of the addition of the depressor agent. Therefore, a difficulty has been encountered in controlling the temperature dependence of dielectric constant over a wide temperature range.

SUMMARY OF THE INVENTION

The first object of the present invention is to provide a perovskite ceramic; which obviates the above-mentioned disadvantages of conventional perovskite ceramic materials without spoiling the excellent characteristics essentially inherent in perovskite ceramic materials as the basic material; which has a high dielectric constant, a small temperature dependence of dielectric constant over a wide temperature range, an easy controllability of the above-mentioned dependence even without any depressor agent, and a small dependence of dielectric constant on the electric field strength; and which can be suitably employed in a ceramic dielectric layer of a ceramic capacitor.

The second object of this invention is to provide a fabrication method of a perovskite ceramic having a high dielectric constant, a small dependence of dielectric constant on the temperature over a wide temperature range, and a small dependence of dielectric constant on the electric field strength.

The third object of this invention is to provide a multilayer ceramic capacitor having a small size, a large capacity, and small dependences of electrostatic capacity on the temperature and the voltage, which uses a perovskite ceramic having a high dielectric constant and small dependences of dielectric constant on the temperature and the electric field strength in a ceramic dielectric layer of the capacitor.

In order to attain these objects, the perovskite ceramic of the present invention is characterized by the conjoint presence of two kinds of perovskite ceramic materials having respective high dielectric constants and mutually different Curie temperatures without forming a complete solid solution of the materials.

Here, the perovskite ceramic of this invention comprising two kinds of perovskite ceramic materials conjointly present therein without forming a complete solid solution thereof may be a ceramic material prepared by separately subjecting raw material powders of two or more kinds of perovskite ceramic materials having mutually different compositions to calcination to form two or more kinds of perovskite ceramic materials having mutually different Curie temperatures, crushing the materials thus formed, mixing the crushed materials at an adequate ratio, and sintering the mixture without forming complete solid solution of the materials.

The temperature of calcination of at least one kind of the above-mentioned two kinds of perovskite ceramic materials may be the same as or higher than the temperature of sintering the mixture of the perovskite ceramic materials.

The two kinds of perovskite ceramic materials may each have a dielectric constant of 1,000 or more at room temperature.

The two perovskite ceramic materials may have respective compositions represented by the formula: $Pb(Fe_{\frac{2}{3}}W_{\frac{1}{3}})_{x_i}(Fe_{\frac{1}{2}}Nb_{\frac{1}{2}})_{1-x_i}O_3$ wherein, in one kind of perovskite ceramic material $i=1$ and in the other kind of perovskite ceramic material $i=2$, and wherein $x_1$ does not equal $x_2$.

To the two kinds of perovskite ceramic materials may be added a minute amount of an oxide of a metal incapable of substituting for atoms occupying the body-centered positions of crystal lattices of the perovskite ceramic materials which oxide has a higher melting point than those of the perovskite ceramic materials. The oxide that may be added may be a kind selected from $Dy_2O_3$, $Gd_2O_3$ and $Sm_2O_3$.

The process for preparing a perovskite ceramic according to the present invention is characterized by comprising the step of separately subjecting raw material powders of two kinds of perovskite ceramic materials having mutually different compositions to calcination to form two or more kinds of perovskite ceramic materials having mutually different Curie temperatures, the step of separately crushing and mixing the perovskite ceramic materials thus formed, and the step of sintering the resulting mixture of the perovskite ceramic materials without forming a complete solid solution of the two kinds of perovskite ceramic materials.

The temperature of calcination of at least one kind of the above-mentioned two kinds of perovskite ceramic materials may be the same as or higher than the temperature of sintering the mixture of the perovskite ceramic materials.

The two kinds of perovskite ceramic materials may each independently have a dielectric constant of 1,000 or more.

The two perovskite ceramic materials may have respective compositions represented by the formula: $Pb(Fe_{\frac{2}{3}}W_{\frac{1}{3}})_{x_i}(Fe_{\frac{1}{2}}Nb_{\frac{1}{2}})_{1-x_i}O_3$ wherein, in one kind of perovskite ceramic material $i=1$ and in the other kind of perovskite ceramic material $i=2$, and wherein $x_1$ does not equal $x_2$.

To the two kinds of perovskite ceramic materials may be added a minute amount of an oxide of a metal incapable of substituting for atoms occupying the body-centered positions of crystal lattices of the perovskite ceramic materials which oxide has a higher melting point than those of the perovskite ceramic materials the oxide that may be added may be a kind selected from $Dy_2O_3$, $Gd_2O_3$, and $Sm_2O_3$.

The multilayer ceramic capacitor of the present invention is characterized by comprising a ceramic dielectric layer made of a perovskite ceramic comprising coexisting two kinds of perovskite ceramic materials having mutually different compositions.

The two kinds of perovskite ceramic materials may each independently have a dielectric constant of 1,000 or more.

The two perovskite ceramic materials may have respective compositions represented by the formula: $Pb(Fe_{\frac{2}{3}}W_{\frac{1}{3}})_{x_i}(Fe_{\frac{1}{2}}Nb_{\frac{1}{2}})_{1-x_i}O_3$ wherein, in one kind of perovskite ceramic material $i=1$ and in the other kind of perovskite ceramic material $i=2$, and wherein $x_1$ does not equal $x_2$.

To the two kinds of perovskite ceramic materials may be added a minute amount of an oxide of a metal incapable of substituting for atoms occupying the body-centered positions of crystal lattices of the perovskite ceramic materials which oxide has a higher melting point than those of the perovskite ceramic materials. The oxide that may be added may be a kind selected from $Dy_2O_3$, $Gd_2O_3$, and $Sm_3O_3$.

BRIEF DESCRIPTION OF THE DRAWINGS

FIGS. 18 to 22 are concerned with embodiments of the present invention, wherein FIGS. 18, 19 and 20 are charts showing variations of dielectric constant with the relative density for the samples Nos. 4, 8 and 10, respectively;

FIG. 24 is a chart showing a comparison in the rate of variation of dielectric constant with electric field strength between an embodiment of the perovskite ceramic of the present invention and a conventional perovskite ceramic;

BEST MODE FOR CARRYING OUT THE INVENTION

Description of the Preferred Embodiments $Pb(Fe_{\frac{2}{3}}W_{\frac{1}{3}})_x(Fe_{\frac{1}{2}}Nb_{\frac{1}{2}})_{(1-x)}O_3 (0 \leq x \leq 1)$ as an embodiment of the present invention.

Figure 2:
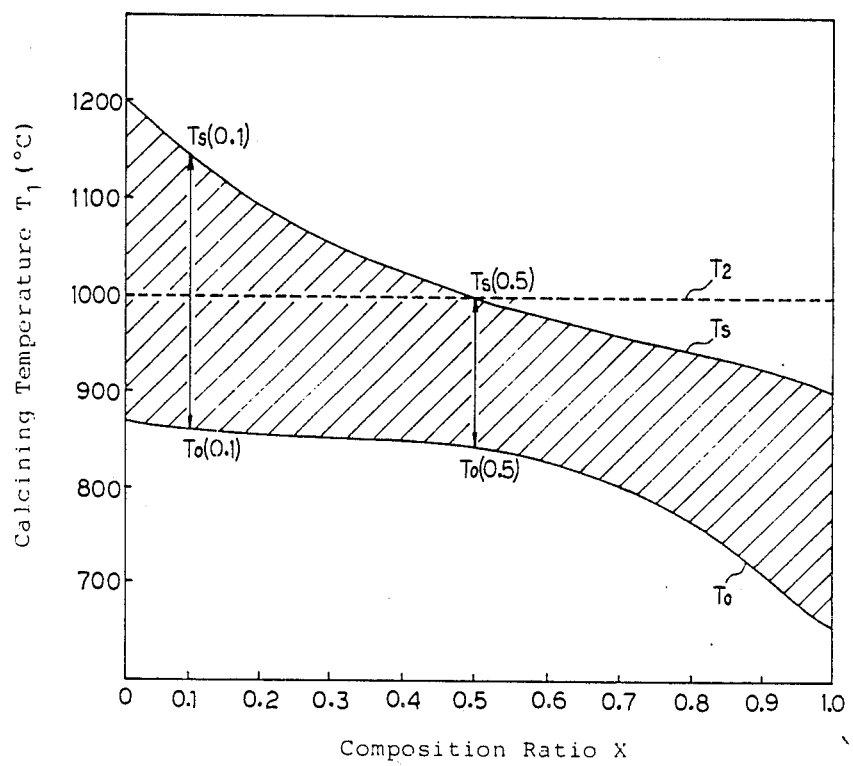
FIG. 2 is a phase diagram showing the relationship between the composition ratio of perovskite ceramic and temperatures To and Ts of crystallization and melting decomposition, respectively, which may give a guideline on the calcining temperature in the present invention.
Figure 3:
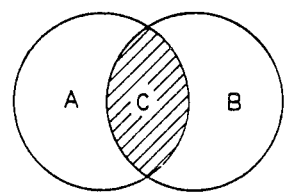
FIG. 3 is a conceptional illustration of the state of crystals in the perovskite ceramic of this invention.

In the $Pb(Fe_{\frac{2}{3}}W_{\frac{1}{3}})_x(Fe_{\frac{1}{2}}Nb_{\frac{1}{2}})_{(1-x)}O_3$ system, the crystallization temperature To and the melting decomposition temperature Ts decrease with an increase in the composition ratio x as shown in FIG. 2. Where a composition with x=A (referred to as a "composition A") and a composition with x=B (referred to as a "composition B") (A<B) are used, it is believed that, when a mixture thereof is sintered, a composition with x=C (referred to as a "composition C"), which is in the form of a solid solution of the composition A and the composition B, may be formed in the crystal grain boundaries of both the compositions as shown in FIG. 3, and that the range of composition ratio for the composition C may be represented by a formula: A<C<B. Accordingly, in order to obtain a perovskite ceramic having the compositions A and B coexisting therein (mixed-sintering ceramic), it is necessary in FIG. 2, ① the calcining temperatures $T_1(A)$ and $T_1(B)$ for the compositions A and B, respectively, be in ranges of $To(A) \leq T_1(A) \leq Ts(A)$ and $To(B) \leq T_1(B) \leq Ts(B)$, respectively, wherein neither melting nor decomposition occurs, and ② that the sintering temperature $T_2$ never exceeds $Ts(B)$ since the composition B begins to melt and decompose to increase the proportion of the composition C when $T_2 > Ts(B)$ though as high a $T_2$ as possible is favorable for raising the ceramic density. Besides, when the $T_1$ of the composition B(=$T_B$), which has a lower Ts than that of the composition A, is such as to be represented by a formula: $T_B > To(B)$, the reactivity of crystal grains for a sintering reaction during the course of sintering is low, leading to a lowered ceramic density. Thus, calcination of $T_B = To(B)$ is favorable. Since the temperature dependence of dielectric constant for a mixed-sintering ceramic of A-B-C thus formed is expressed in the form of a compound of temperature dependences of dielectric constant for respective component compositions in accordance with the mixing ratios thereof, it is lowered. Incidentally, needless to say, this principle can basically apply to a mixture of three or more kinds of compositions having mutually different composition ratios and a mixture of different perovskite ceramic materials (for example, $Pb(Fe_{\frac{2}{3}}W_{\frac{1}{3}})_x(Fe_{\frac{1}{2}}Nb_{\frac{1}{2}})_{(1-x)}O_3$ and $BaTiO_3$).

EXAMPLE 1

Figure 1:
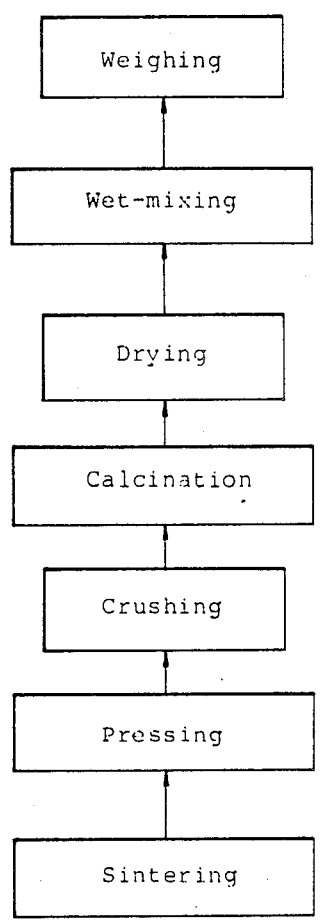
FIG. 1 is a flow chart illustrating a conventional fabrication method of a ceramic dielectric.
Figure 4:
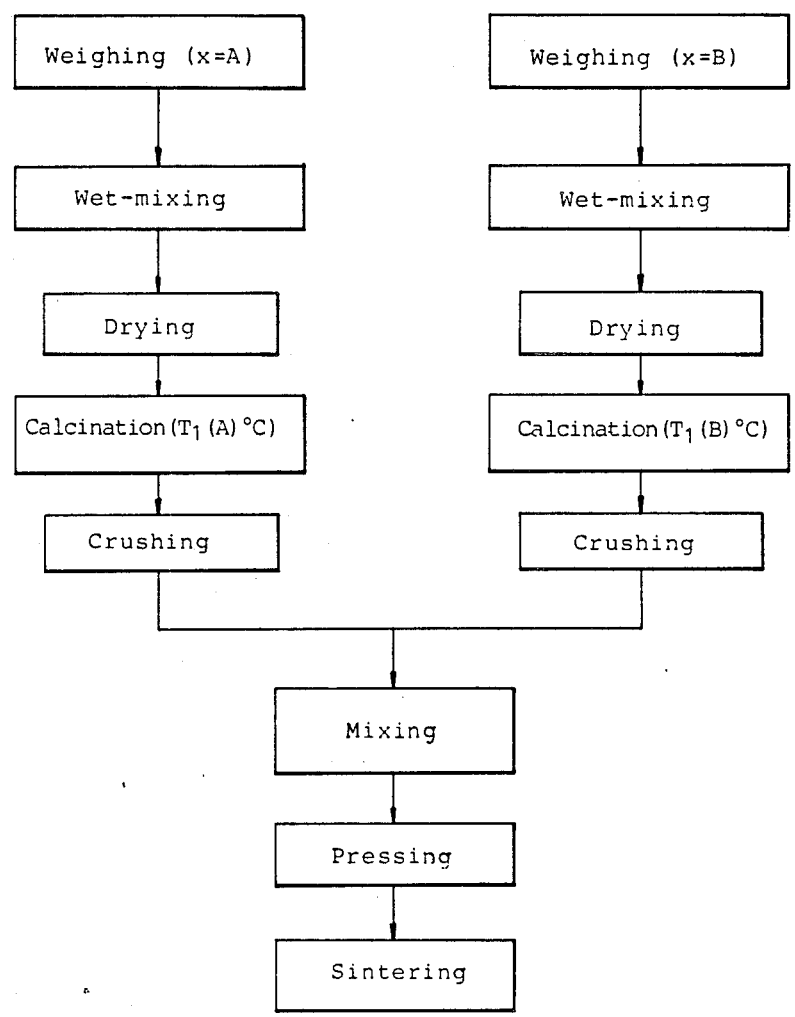
FIG. 4 is a flow chart illustrating an embodiment of the fabrication method of a perovskite ceramic according to the present invention.

FIG. 4 illustrates a fabrication method of a perovskite ceramic from two kinds of perovskite ceramic materials having mutually different Curie temperatures according to an embodiment of this invention. The only differences of the process according to this embodiment from the conventional process of calcination of a ceramic material as shown in FIG. 1 are that the steps of weighing raw material powders, calcining, and crushing are divided into two lines thereof, and that the step of mixing the compositions formed by calcination is added as a subsequent step. Thus, there is no need of a large change from the conventional process. An outstanding feature of the process according to this embodiment is that the existing equipment for conventional calcination of a ceramic material can be employed as such.

A mixed-sintering ceramic prepared from a composition with $x_1 = 0.1$ (composition 0.1) and a composition with $x_2 = 0.5$ (composition 0.5) among compositions expressed by the formula: $Pb(Fe_{\frac{2}{3}}W_{\frac{1}{3}})_{x_i}(Fe_{\frac{1}{2}}Nb_{\frac{1}{2}})_{1-x_i}O_3$, where i=1 or 2, and $x_1$ does not equal $x_2$ will now be explained.

PbO, $Fe_2O_3$, $WO_3$ and $Nb_2O_5$ were used as raw material powders They were so weighed as to provide values as shown in Table 1 in accordance with the process as shown in FIG. 4. 300 ml of pure water was added to each of two compositions thus provided, and the resulting mixture was subjected to wet-mixing in a ball mill for 24 hours, followed by drying in air of 150° C. for two hours. Subsequently, the composition 0.1 and the composition 0.5 were respectively calcined in air, and crushed to an average grain size of 1 μm or less by a ball mill. Thereafter, 50 mol % each of the two compositions were mixed, and about 1 ml of a 0.5% polyvinyl alcohol solution was added as the binder to 10 g of the mixed composition, followed by pressing under a pressure of 3 tons/cm² to prepare pellets having a diameter of 12 mm and a thickness of 0.7 mm.

TABLE 1

|  | PbO (g) | Fe$_2$O$_3$ (g) | WO$_3$ (g) | Nb$_2$O$_5$ (g) |
|---|---|---|---|---|
| x = 0.1 | 67.23 | 12.43 | 2.33 | 18.02 |
| x = 0.5 | 65.33 | 13.63 | 11.31 | 9.73 |

Conditions to be checked in obtaining a mixed-sintering ceramic from the composition $x_1$ and the composition 0.5 in reference to FIG. 2 are as follows.

① As to the calcining temperature $T_1(=T_{0.1})$ of the composition 0.1, 850° C.$\leq T_{0.1} \leq$ 1,150° C.

② As to the calcining temperature $T_1(=T_{0.5})$ of the composition 0.5, $T_{0.5}$=850° C.

③ As to the sintering temperature $T_2(=Ts(0.5))$, $T_2$=1,000° C.

Thus, calcination of the composition 0.1 and the composition 0.5 was carried out in air at respective temperature as shown in Table 2. X-ray diffraction patterns of the calcined compositions were measured with a CuKα radiation in a range of 2θ=20°-90° to confirm crystallization. The pressed-formed pellets were sintered in air at 1,000° C. The relative densities (=apparent density d/theoretical density $d_o$) of the sintered ceramics were 0.75 to 0.87. In the same way as described above, X-ray diffraction patterns of these ceramics were measured. The results are partially shown in FIGS. 5 and 6.

TABLE 2

| Sample No. | Calcining temperature (°C.) | | Dielectric constant | tan δ (%) | Resistivity (Ω · cm) |
|---|---|---|---|---|---|
|  | $x_1$ = 0.1 | $x_2$ = 0.5 | $\epsilon_r$ (20°) | (20°) | (20° C.) |
| 1 | 850 | 850 | 18,300 | 1.1 | 1.5 × 10$^9$ |
| 2 | 950 | 850 | 19,600 | 1.1 | 5.0 × 10$^9$ |
| 3 | 1000 | 850 | 10,800 | 1.0 | 1.3 × 10$^9$ |
| 4 | 1050 | 850 | 10,000 | 0.8 | 5.0 × 10$^9$ |
| 5 | 1150 | 850 | 8,800 | 1.0 | 3.0 × 10$^9$ |

Figure 6:
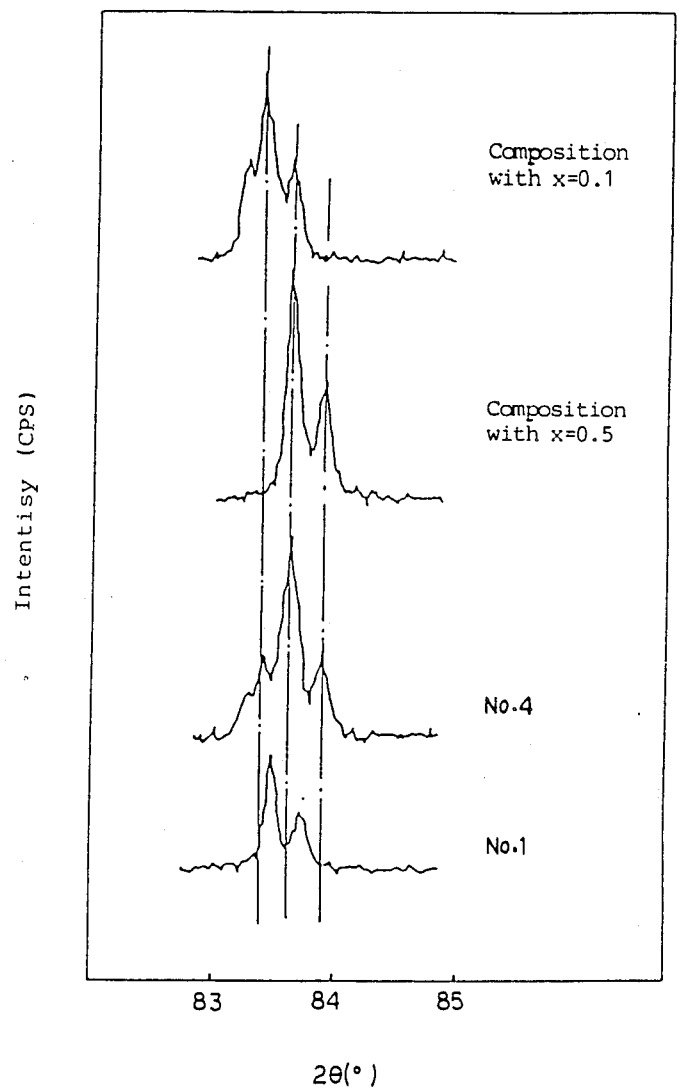
Figure 7:
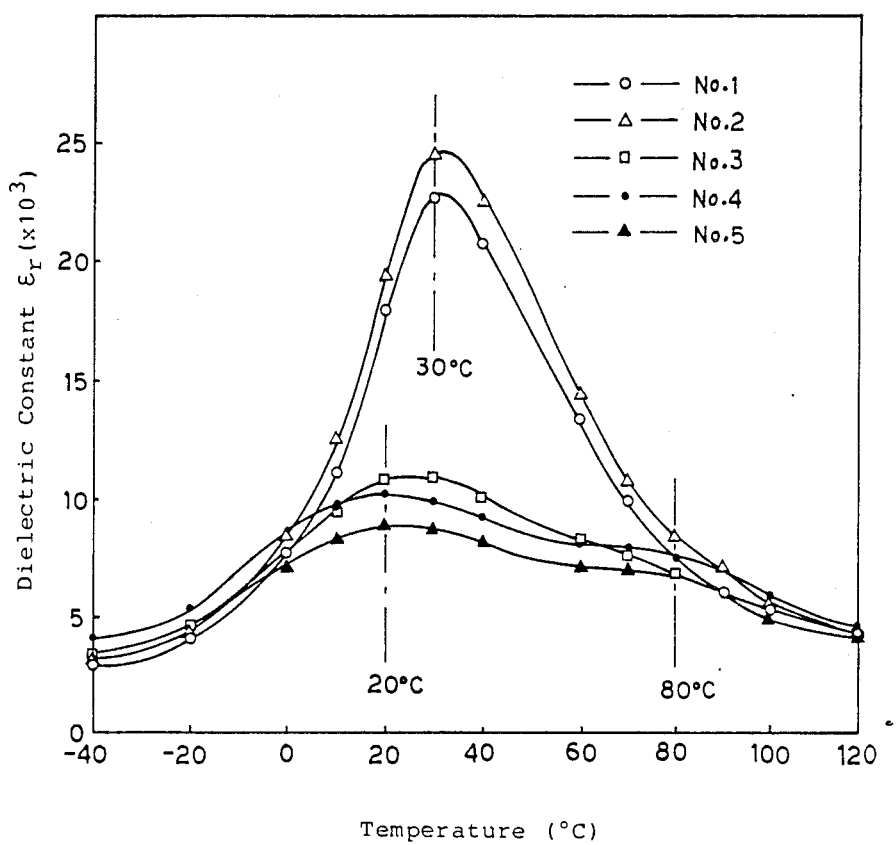
FIG. 7 is a chart showing the variation of the temperature dependence of dielectric constant with conditions of calcination of a perovskite ceramic composed of an equimolar mixture of compositions with $x_1=0.1$ and $x_2=0.5$ in the formula: $Pb(Fe_{\frac{2}{3}}W_{\frac{1}{3}})_{x_i}(Fe_{\frac{1}{2}}Nb_{\frac{1}{2}})_{1-x_i}O_3$, where $i=1$ or 2, and $x_1$ is not equal to $x_2$ in an embodiment of the present invention.

Silver was electroded on both surfaces of the sintered ceramics for measurements of dielectric properties of the ceramics. Thereafter, the dielectric constant $\epsilon_r$ and dielectric loss tangent tan δ of every ceramic were measured at 1 kHz, 1 Vrms, in a measurement temperature range of −40° to 120° C. The resistivity was measured at 50 V dc at room temperature. The results are shown in FIG. 7 and Table 2. Incidentally, each No. in FIGS. 5, 6 and 7 corresponds to the sample No. in Table 2.

(a) X-Ray Diffraction

Figure 5:
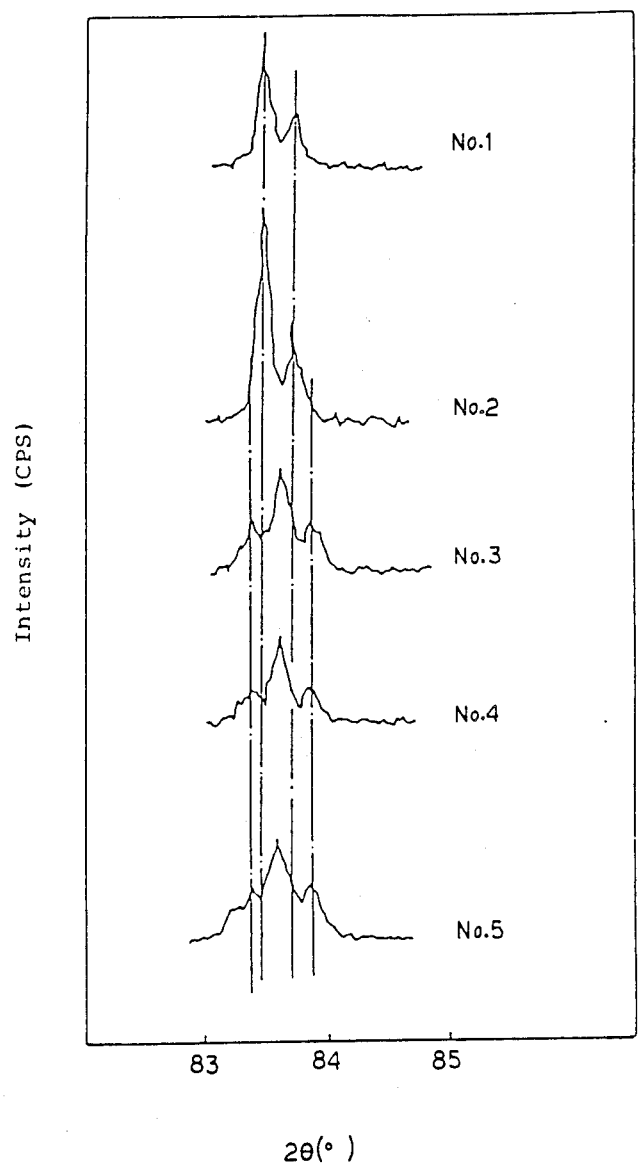
FIGS. 5 and 6 are X-ray diffraction charts of the perovskite ceramics according to the present invention.

According to the results of X-ray diffraction, all the ceramics in Table 2 proved to have a perovskite structure, and, hence, not to be different in the crystal system itself. However, high-angle diffraction peaks proved to differ from sample to sample. As an instance of this, FIG. 5 shows a comparison in diffraction peaks of the (222) plane. As is apparent in the figure, in the samples Nos. 3, 4 and 5 prepared at $T_{0.1} \geq$ 1,000° C., the number of diffraction peaks increased from 2 to 3, and the peak angles changed. For examining these changes in more detail, a comparison in diffraction peak of the (222) plane were made between the sample No. 1 prepared at $T_{0.1}$ < 1,000° C., the sample No. 4 prepared at $T_{0.1} \geq$ 1,000° C., and the composition 0.1 and the composition 0.5 as the basic components as shown in FIG. 6. As is apparent from the figure, the diffraction peaks of the sample No. 1 prepared at $T_{0.1}$ < 1,000° C. do not agree with those of either the composition 0.1 or the composition 0.5. On the other hand, when a comparison in diffraction peak angles was made between the sample No. 4 prepared at $T_{0.1} \geq$ 1,000° C. and the other compositions, the diffraction peaks of both the compositions 0.1 and 0.5 are observed in the sample No. 4. This may suggest formation of a mixed-sintering ceramic from the compositions 0.1 and 0.5. Additionally stated, the same results as described above were obtained as to the (221) plane and the (331) plane.

(b) Dependence of Dielectric Constant on Temperature

Figure 8:
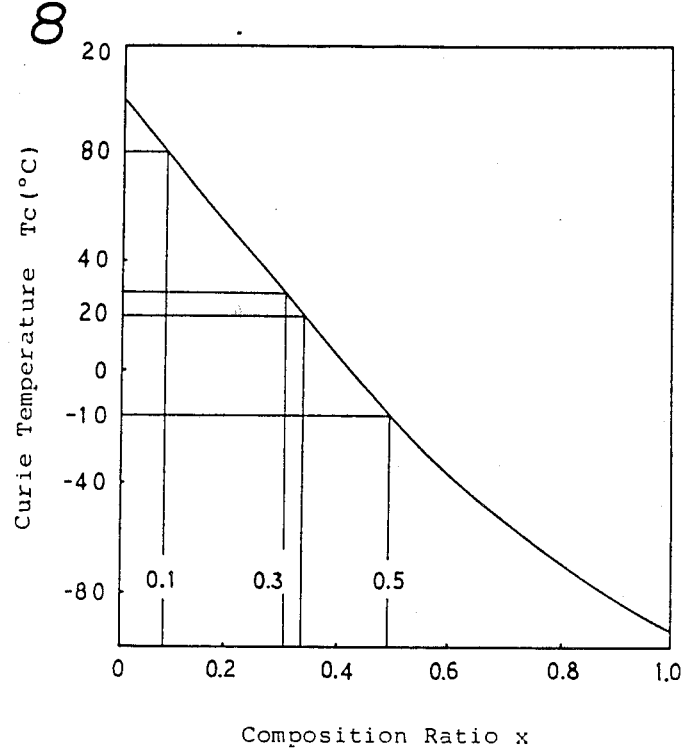
FIG. 8 is a chart showing the relationship between the composition ratio and the Curie temperature.

The dependences of dielectric constant on the temperature for the ceramics shown in Table 2 are shown in FIG. 7. As illustrated in the figure, the samples Nos. 1 and 2 prepared at $T_{0.1}$ < 1,000° C. provide sharp peaks of single dielectric constant around 30° C. According to the relationship between the composition ratio x and the Curie temperature Tc as shown in FIG. 8 [see H. Takamizawa et al.: NEC Research and Development, 64, 10–17 (1982)], the peak temperature around 30° C. corresponds to the composition with x=0.3 (composition 0.3), suggesting a complete solid solution composed of equimolar amounts of the compositions 0.1 and 0.5. The mixed-sintering ceramic of the samples Nos. 3, 4 and 5 prepared at $T_{0.1}$ > 1,000° C. provides a weak peak around 80° C. in addition to a peak around 20° C. The collation of the results with FIG. 8 in the same way as described above suggests formation of a mixed-sintering ceramic of a composition with x≃0.3 (composition ≃0.3) and the composition 0.1.

Figure 9:
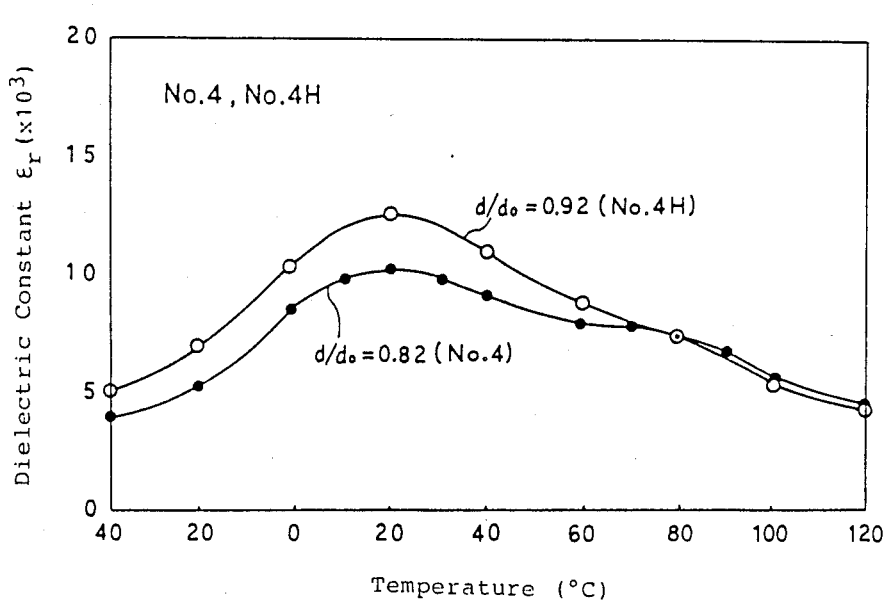
FIG. 9 is a chart showing a variation of the temperature dependence of dielectric constant with different relative densities.

The dielectric constant of a mixed-sintering ceramic varies depending on the density of the ceramic as will be described later in detail. FIG. 9 shows temperature dependences of dielectric constant for the samples Nos. 4 and 4H having ratios d/$d_o$ of apparent density d to theoretical density do (relative densities) of 0.82 and 0.92, respectively. The positions of the peaks around 20° C. and 80° C. are not different, but the mixed-sintering ceramic having the higher density is higher in dielectric constant.

(c) Analysis of Mode of Coexistence By Equivalent Circuit

Figure 10A:
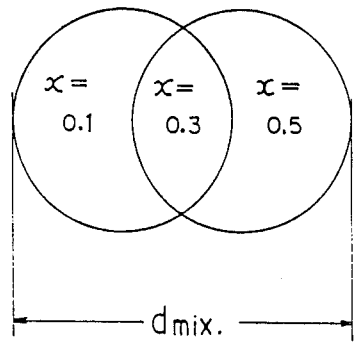
FIG. 10A is an illustration of the state of crystals in the perovskite ceramic of the present invention.

The mixed-sintering ceramics proved to be a mixture of the composition 0.1 and the composition 0.5 according to the X-ray diffraction but a mixture of the composition 0.1 and the composition ≃0.3 according to the temperature dependence of dielectric constant. In view of this, in order to presume a proportion of each component, an equivalent circuit as shown in FIG. 10B was conceived with a hypothetical model in which the composition 0.3 might be formed around crystal grain boundaries of the compositions 0.1 and 0.5 as shown in FIG. 10A on the assumption that the compositions 0.1, 0.3 and 0.5 may coexist in a mixed-sintering ceramic.

Figure 10B:
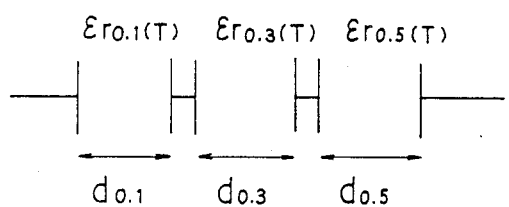
FIG. 10B is an equivalent circuit diagram of FIG. 10A.

From FIG. 10B, the dielectric constant $\delta_{rmix}(T)$ of the mixed-sintering ceramic at a temperature T can be expressed by the following equation.

$$\epsilon_{rmix}(T) = \frac{d_{mix} (= d_{0.1} + d_{0.3} + d_{0.5})}{\frac{d_{0.1}}{\epsilon_{r0.1}(T)} + \frac{d_{0.3}}{\epsilon_{r0.3}(T)} + \frac{d_{0.5}}{\epsilon_{r0.5}(T)}} \quad (1)$$

wherein $d_{0.1}$, $d_{0.3}$ and $d_{0.5}$ are thicknesses of the compositions with $x = 0.1$, $0.3$ and $0.5$, respectively; and $\epsilon_{r0.1}(T)$, $\epsilon_{r0.3}(T)$ and $\epsilon_{r0.5}(T)$ are $\epsilon_r$ values of the compositions with $x = 0.1$, $0.3$ and $0.5$ at a temperature T, respectively.

Figure 11:
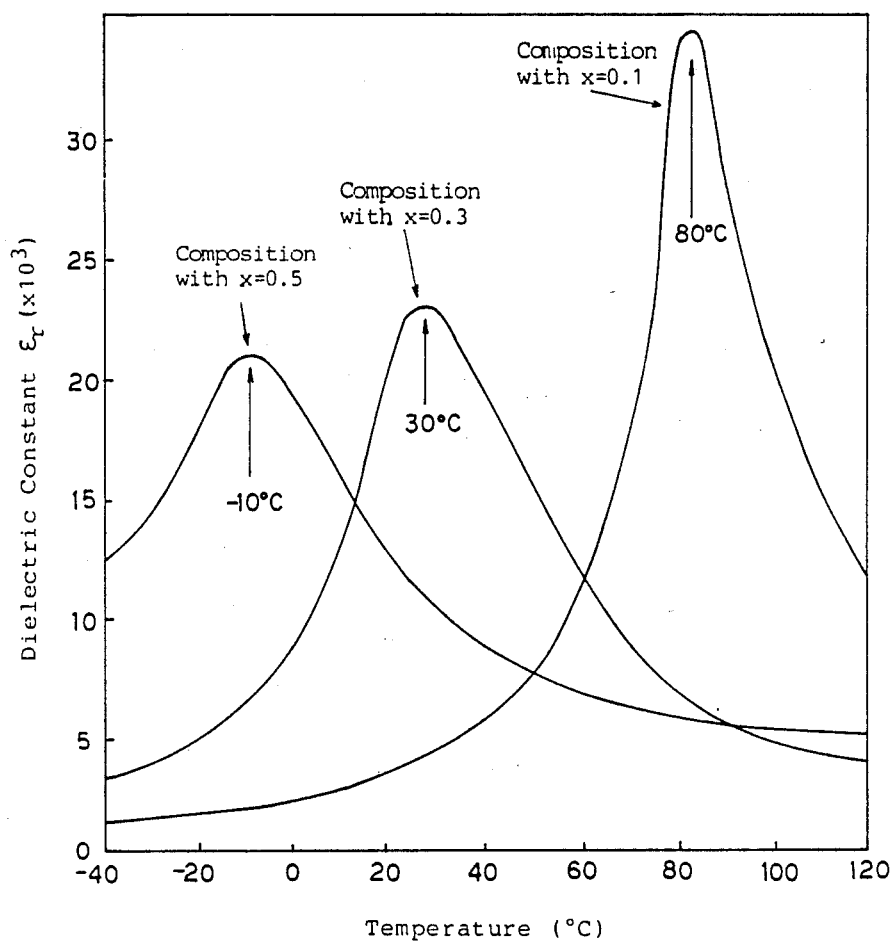
FIG. 11 is a chart showing the temperature dependence of dielectric constant for unit compositions.

The $d_{mix}$ in the equation (1) was set to be 15 μm since the average grain size of the sample No. 4 in Table 2 was 7.5 μm (Martin diameter). On the other hand, the $\epsilon_{r0.1}(T)$, $\epsilon_{r0.3}(T)$ and $\epsilon_{r0.5}(T)$ was determined from the temperature dependences of dielectric constant for the respective compositions as shown in FIG. 11.

Figure 12:
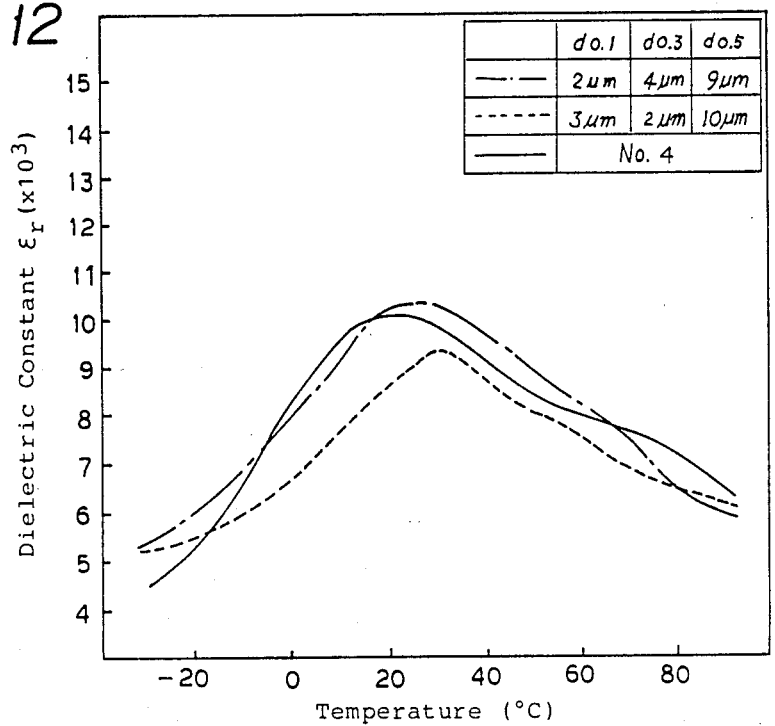
FIGS. 12 and 13 are charts showing the temperature dependences of dielectric constant based on the experimental values and the calculated values for the samples Nos. 4 and 4H with relative densities of 0.82 and 0.92, respectively.

The values of $\epsilon_{rmix}$ in a range of $-30°$ to $90°$ C. were found using the thickness $d_{0.1}$, $d_{0.3}$ and $d_{0.5}$ as the parameters, and compared with those of the sample No. 4 having a relative density of 0.82 as shown in FIG. 12.

It has been clarified from the figure that, when $d_{0.1}$ is approximately equal to $d_{0.3}$, and when $d_{0.5}$ is about three times as large as $d_{0.1}$ or $d_{0.3}$, the calculated values substantially agree with the experimental values with respect to the sample No. 4 having a relative density of 0.82.

Figure 13:
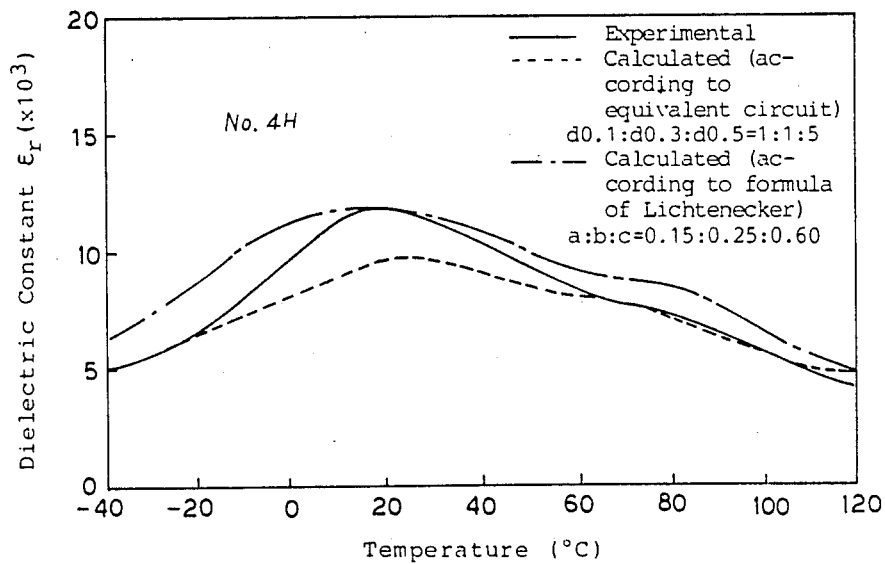

On the other hand, the mixed-sintering ceramic highly densified to have a relative density of 0.92 (sample No. 4H) had a smaller average grain diameter of 3.5 μm. Therefore, it has been clarified that, when calculation is made using $d_{0.1}$, $d_{0.3}$ and $d_{0.5}$ as parameters with $d_{mix}$ of 7 μm in the equation (1), the calculated values substantially agree with the experimental values in the case of $d_{0.1}:d_{0.3}:d_{0.5} = 1:1:5$ as shown in FIG. 13.

The Lichtenecker's formula is well known as an empirical formula giving the dielectric constant of a mixture, and expressed by the following equation.

$$\epsilon_{rmix}(T) = \epsilon_{r0.1}(T)^a \cdot \epsilon_{r0.3}(T)^b \cdot \epsilon_{r0.5}(T)^c \quad (2)$$

In the equation (2), a, b and c are respective volume ratios of the composition 0.1, the composition 0.3 and the composition 0.5; and $a+b+c=1$. As a result of calculation of the value of $\epsilon_{rmix}$ which was made using $\epsilon_{r0.1}(T)$, $\epsilon_{r0.3}(T)$ and $\epsilon_{r0.5}(T)$ found from FIG. 11 as well as a, b and c as the parameters in the same way as in the case of the equation of the equivalent circuit, it has been clarified that the calculated values substantially agree with the experimental values in the case of $a:b:c = 0.15:0.25:0.60$. These results may prove good approximation to the experimental values, when consideration is given to the facts that pellets of the sample are disks having a very small thickness in comparison with diameter thereof, that the volume ratio of a:b:c can be regarded as being substantially equivalent to the thickness ratio of $d_{0.1}:d_{0.3}:d_{0.5}$ in the equation of the equivalent circuit, and that the above-mentioned formula of $a:b:c = 0.15:0.25:0.60$ can be rewritten to read $a:b:c = 1:1.7:4.0$ which is considerably close to $1:1:5.0$ in the equation of the equivalent circuit.

(d) Observation of Crystal by Scanning Electron Microscope (SEM)

Figure 14:
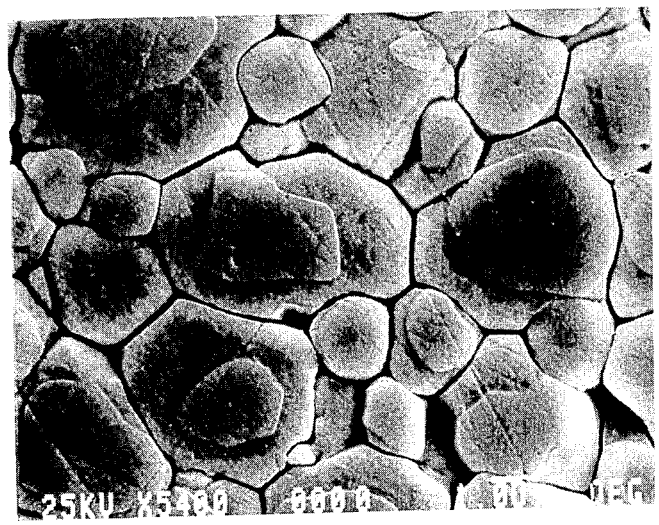
FIG. 14 is an SEM photograph showing a ceramic surface of an embodiment of the perovskite ceramic of the present invention.

The crystal structure of the mixed-sintering ceramic (sample No. 4H in Table 5) having a relative density of 0.92 and the same composition as that of the sample No. 4 in Table 2 and prepared under the same calcination conditions as in the case of the sample No. 4 was observed by SEM. The SEM photograph (magnification:x 5,400) of the ceramic surface, which was prepared by polishing the surface of the ceramic, etching the resulting surface with an etching solution composed of 95 ml of pure water, 5 ml of HCl, and about 0.3 ml of HF, and subjecting the etched surface to Au coating, is shown in FIG. 14. The crystal grains included two kinds of grains, large crystal grains and small crystal grains. The peripheral portion of each crystal grain is etched deeper than the central portion thereof to provide an appearance like stairs. This may suggest that the two kinds of crystal grains having mutually different compositions each have regions of a phase of solid solution with the other component in addition to respective regions of essential components.

Figure 15:
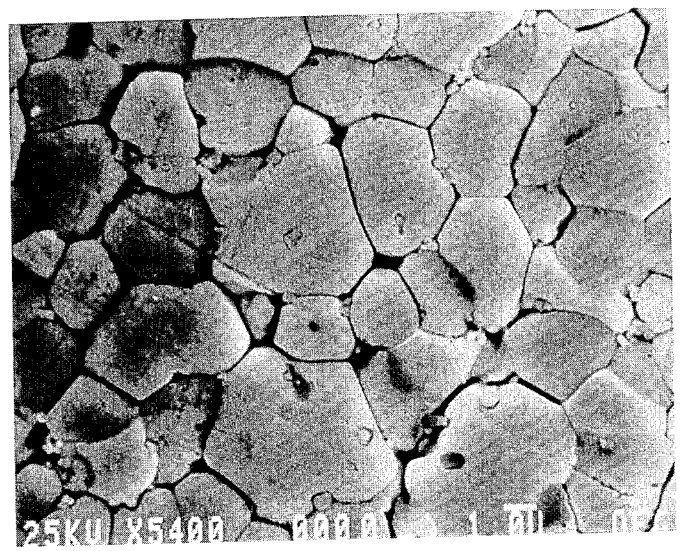
FIG. 15 is an SEM photograph showing a ceramic surface of a conventional perovskite ceramic.

An SEM photograph of a conventional ceramic (composition with $x = \frac{1}{3}$) etched in the same manner as described above is shown in FIG. 15. It will be understood that the conventional ceramic consists of uniform crystal grains.

As will be understood from the above, when the calcining temperature of the composition 0.1 is the same as or higher than the sintering temperature (1,000° C.), the resulting mixed-sintering ceramic is not a complete solid solution but a mixture of the composition 0.1, the composition 0.3, and the composition 0.5. Therefore, the temperature dependence of dielectric constant is reduced. Thus, it has been demonstrated that, when the calcining temperature of a composition to be calcined at the higher temperature, namely the composition 0.1, is set higher than the sintering temperature of a mixture of two compositions, the mixture does not turn to a complete solid solution. Accordingly, when three or more kinds of compositions are to be mixed, at least one kind of component composition, calcination temperature of which is not lowest in the compositions to be mixed, only to be calcined at a higher temperature than that of sintering of the mixture. The ceramics of the samples Nos. 3, 4 and 5 are not only reduced in the variation of dielectric constant $\epsilon_r$ with the temperature to about $\frac{1}{2}$ those of the samples Nos 1 and 2, but also comparably small in tan δ to those of the samples Nos. 1 and 2 as shown in Table 2 and relatively high in resistivity. Although the sintered temperature of the composition 0.1 exceeds 1,000° C., a mixture thereof with the composition 0.5 can be calcined at a temperature of 1,000° C. below the above-mentioned temperature. Since the lattice constants of the composition 0.1 and the composition 0.5 are 4.016 Å and 4.006 Å, respectively, which are close to each other, the ceramic characteristically does not have any distortion formed and is not reduced in mechanical strength.

EXAMPLE 2

The influence of a mixing ratio on dielectric properties was examined. Compositions prepared by so weighing as to provide respective composition ratios of $x_1 = 0.1$ and $x_2 = 0.5$ and separately calcining at 1,050° C. and 850° C., respectively were mixed at varied mixing ratios: $Y = x_2/(x_1 + x_2)$ as shown in Table 3 and sintered in at 1,000° C. The relative densities of the sintered ceramics were 0.82 to 0.88. Table 3 shows values of dielectric constant, tan δ, and resistivity with respect to the sintered ceramics, too. The table demonstrates that $\epsilon_r$ increases as the mixing ratio Y increases.

TABLE 3

| Sample No. | Mixing ratio Y $0.5\, x_2/(x_1 + x_2)$ (mol %) | Dielectric constant $\epsilon_r$ (20° C.) | Tan δ (%) (20° C.) | Resistivity (Ω · cm) (20° C.) |
|---|---|---|---|---|
| 6 | 60 | 9,400 | 0.4 | $2.0 \times 10^{10}$ |
| 7 | 70 | 9,800 | 1.2 | $2.0 \times 10^{10}$ |
| 8 | 80 | 11,400 | 0.8 | $1.0 \times 10^{10}$ |

Figure 16:
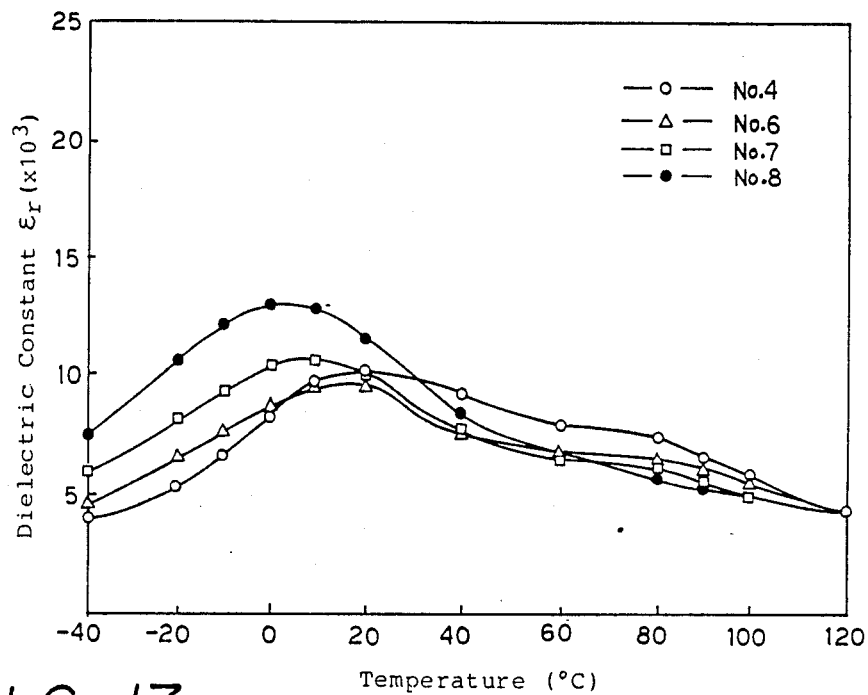
FIG. 16 is a chart showing a variation of the temperature dependence of dielectric constant with the mixing ratio of compositions in an embodiment of the perovskite ceramic of the present invention.

FIG. 16 shows the relationship between the mixing ratio Y and the temperature dependence of the dielectric constant. Each No. in FIG. 16 corresponds to the sample No. in Table 3. The results of the sample No. 4 in Table 2 above, which corresponds to Y=50 mol %, were added to the figure. As shown in the figure, with an increase in the mixing ratio Y, the peak around 80° C., which in corresponds to the peak of the composition 0.1, sequentially lowers whereas the peak on the low temperature side rises with a slight shift thereof from 20° C., to 0° C. Therefore, the temperature dependence of dielectric constant in a range of −25° C. to 85° C. (stipulated as Y characteristic in JIS) increases. It has been demonstrated from the above that the temperature dependence of the dielectric constant in a given temperature range (25° C. to 85° C. in the above case) can be controlled by the mixing ratio Y.

EXAMPLE 3

The influence of a combination of composition ratios on dielectric properties was examined.

Figure 17:
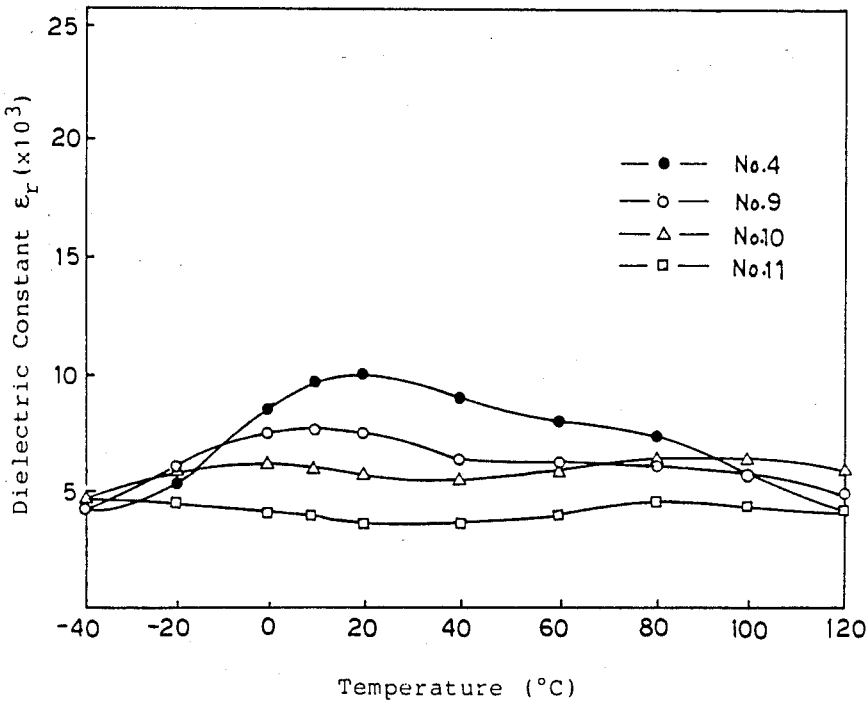
FIG. 17 is a chart showing a variation of the temperature dependence of dielectric constant with the combination of composition ratios.

When the composition ratios $x_1$ and $x_2$ are set to 0.1 and 0.6, 0.7 or 0.9, respectively, the calcination and sintering conditions derived from FIG. 2 are as shown in Table 4. Mixtures having a mixing ratio Y of 50 mol % were sintered in air. The relative densities of the resulting mixed-sintering ceramics were 0.72 to 0.82. FIG. 17 shows the temperature dependence of dielectric constant for the pelletized ceramics. Each No. in FIG. 17 corresponds to the sample No. in Table 4. The results of the sample No. 4 with B=0.5 in Table 2 above were added to the figure. Table 4 shows the values of dielectric constant $\epsilon_r$, tan δ, and resistivity at 20° C. with respect to the sintered ceramics. As can be seen in the table, there is a tendency that, with an increase in the composition ratio B, the resistivity rises, but the $\epsilon_r$ lowers, and the tan δ increases.

TABLE 4

| Sample No. | Calcining Temperature (°C.) $x_1 = 0.1$ | $x_2 = B(B)$ | Sintering Temperature (°C.) | Dielectric constant ($\epsilon_r$) (20° C.) | Tan δ (%) (20° C.) | Resistivity (Ω · cm) (20° C.) |
|---|---|---|---|---|---|---|
| 9 | 1050 | 800(0.6) | 1000 | 7500 | 1.3 | $4.5 \times 10^9$ |
| 10 | 1050 | 800(0.7) | 1000 | 5800 | 2.0 | $1.9 \times 10^9$ |
| 11 | 1050 | 700(0.9) | 950 | 3600 | 2.6 | $4.8 \times 10^{10}$ |

As shown in FIG. 17, in this case where the combination of composition ratios was varied, the mixed-sintering ceramics obtained shows two peaks in the temperature dependence of dielectric constant. As the value of the composition ratio B increases, the peak on the low temperature side sequentially shifts toward the low temperature side though the peak around 80° C., which corresponds to the peak of the composition 0.1, does not shift. With an increase in the value of B, the dielectric constant lowers but the temperature dependence thereof becomes smaller in a wide temperature range.

Thus, it has been demonstrated that the temperature range wherein the temperature dependence of dielectric constant is small can be controlled by the combination of composition ratios of compositions mixed.

EXAMPLE 4

The influence of the density of a mixed-sintering ceramic on the dielectric constant thereof will be discussed.

The relative density $d/d_o$ of a mixed-sintering ceramic varies depending on the grain sizes of ceramic materials calcined and crushed, the pressure of pressing into a pellet, etc. As the gain size of the materials to be pressed is smaller, and/or as the pressure at the time of pressing is higher, the relative density is more increased.

Figure 18:
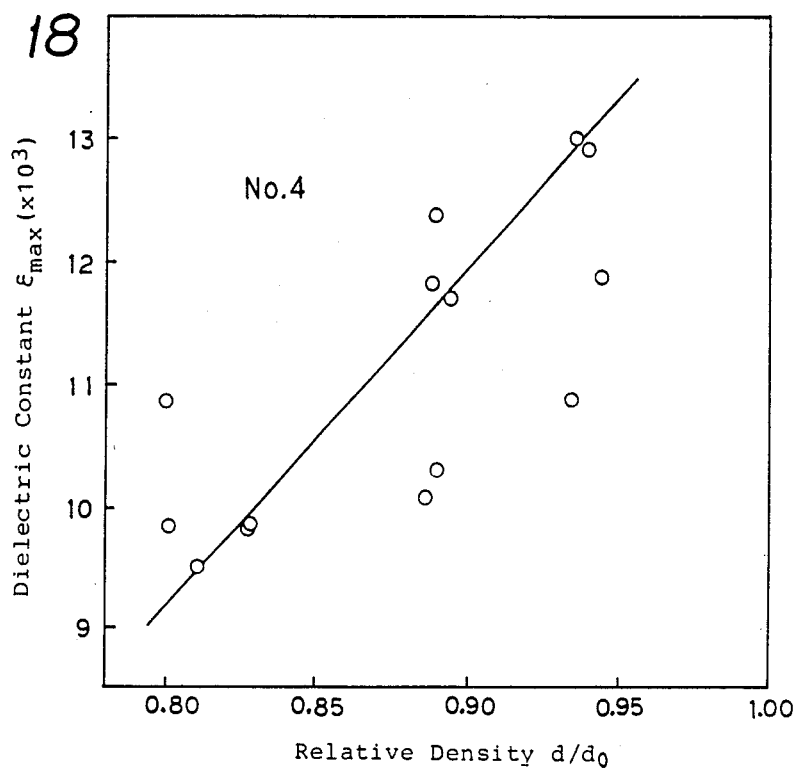

Mixed-sintering ceramics having varied densities were prepared using the same composition, and calcining and sintering conditions as in the case of the sample No. 4 in Table 2 in Example 1. More specifically, a composition 0.1 in the $Pb(Fe_{\frac{2}{3}}W_{\frac{1}{3}})_x(Fe_{\frac{1}{2}}Nb_{\frac{1}{2}})_{1-x}O_3$ system was calcined at 1,050° C. while a composition 0.5 in the system was calcined at 850° C. After crushing, equimolar amounts of the compositions were mixed and sintered at 1,000° C. The varied densities were provided by varying the crushing time after the calcination and the pressure of press forming. The dielectric constants of the mixed-sintering ceramics having the same composition but varied densities are shown in FIG. 18. In the figure, $\epsilon_{max}$ represents maximum values of dielectric constant appearing at 20° C. in mixed-sintering ceramics.

Figure 19:
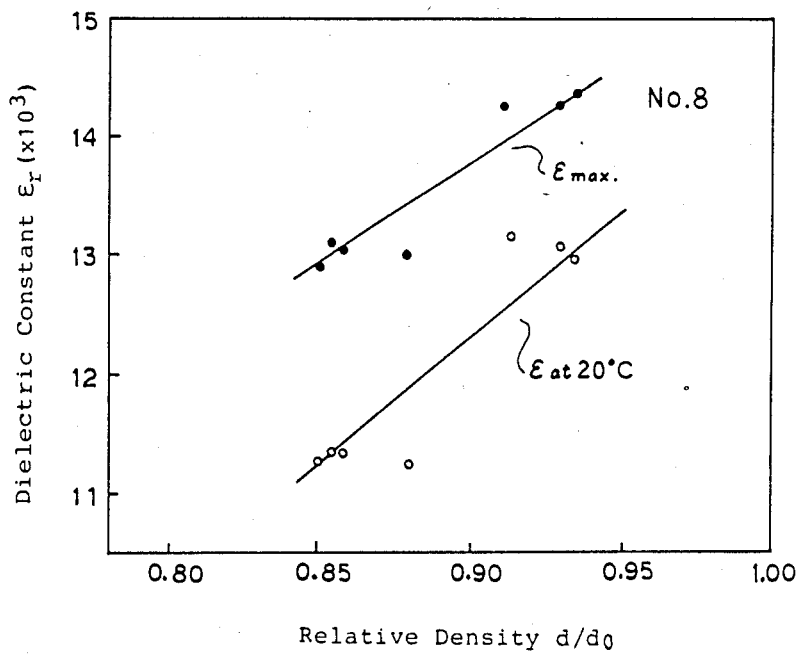
Figure 20:
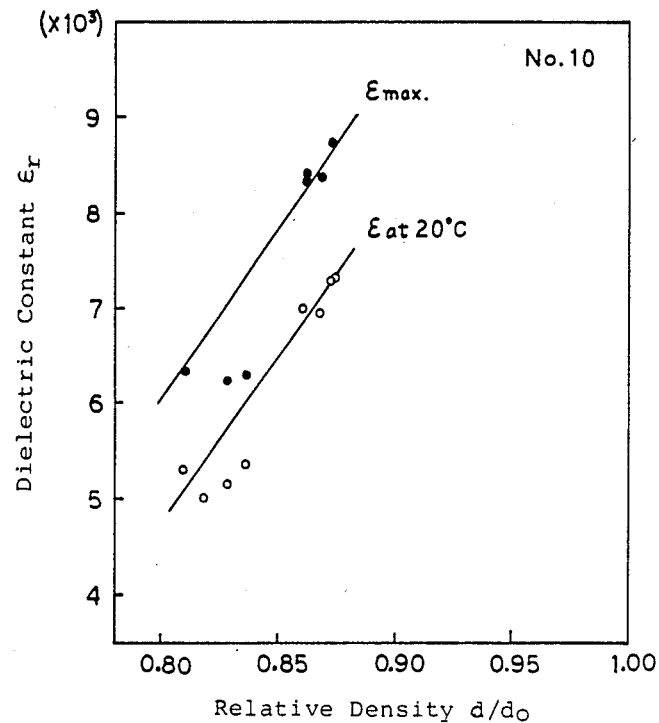

FIG. 19 shows the relationship between the dielectric constant and the relative density in mixed-sintering ceramics having a composition of the sample No. 8 as in Table 3 in Example 2. In the figure, $\epsilon_{max}$ represents a maximum values of dielectric constant appearing around 0° C., and $\epsilon_{at\,20°\,C.}$ represents values of dielectric constant at 20° C. FIG. 20 shows a relationship between the dielectric constant and the relative density in mixed-sintering ceramics having a composition of the sample No. 10 as in Table 4 in Example 3. In the figure, $\epsilon_{max}$ and $\epsilon_{at\,20°\,C.}$ represents maximum values of dielectric constant appearing around −20° and values of dielectric constant at 20° C., respectively.

As can be seen in FIGS. 18 to 20, the dielectric constant of the mixed-sintering ceramic increases with an increase in the relative density.

Figure 21:
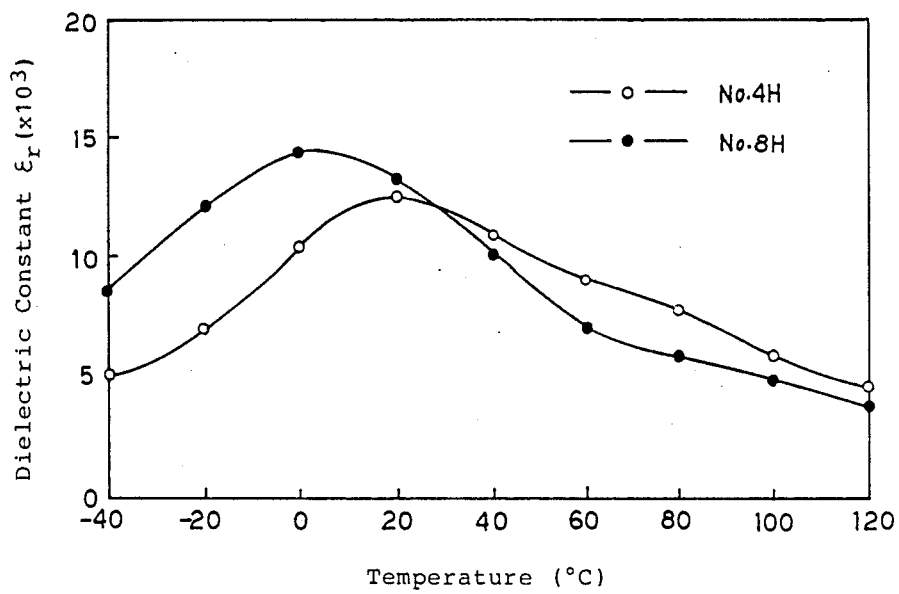

A composition 0.1 of 0.8 μm or less in average grain size and a composition 0.5 of 0.5 μm or less in average grain size were mixed at a mixing ratio of Y=50 mol % (sample No. 4H) and Y=80 mol % (sample No. 8H), subjected to pressing, and sintered to obtain mixed-sintering ceramics having relative densities of 0.92 and 0.93, respectively. The sintering conditions were the same as in Examples 1 and 2. The temperature dependences of dielectric constant and dielectric properties for the mixed-sintering ceramics thus highly densified (samples Nos. 4H and 8H) are shown in FIG. 21 and Table 5, respectively. These ceramics shows marked increases in dielectric constant particularly at 100° C. and lower temperatures, as compared with the ceramics of the samples Nos. 4 and 8 having lower densities as shown in FIGS. 7 and 16, respectively. Further, the highly densified ceramics (the samples Nos. 4H and 8H) are smaller in tan δ and higher in resistivity as shown in Table 5.

TABLE 5

| Sample No. | Mixing ratio Y (mol %) | Relative density | Dielectric constant ($\epsilon_r$) (20° C.) | Tan δ (%) (20° C.) | Resistivity (Ω · cm) (20° C.) |
|---|---|---|---|---|---|
| 4  | 50 | 0.82 | 10000 | 0.8 | $5.0 \times 10^9$ |
| 4H | 50 | 0.92 | 12000 | 0.4 | $5.0 \times 10^{11}$ |
| 8  | 80 | 0.87 | 11400 | 0.8 | $1.0 \times 10^{10}$ |
| 8H | 80 | 0.93 | 13000 | 0.6 | $5.0 \times 10^{11}$ |

Figure 22:
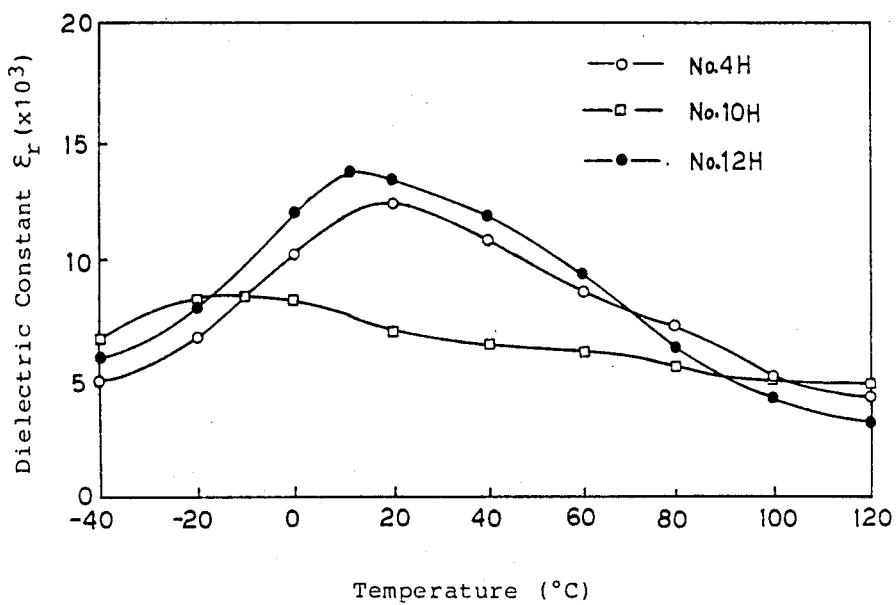

The temperature dependences of dielectric constant and dielectric properties for mixed-sintering ceramics having varied combinations of composition ratios and increased densities are shown in FIG. 22 and Table 6, respectively. In the figure, the sample No. 10H is a mixed-sintering ceramic prepared from an equimolar mixture of the composition 0.1 and the composition 0.7, and having a relative density of 0.87. The sintering conditions were the same as in Example 3. The sample No. 12H is a mixed-sintering ceramic prepared by mixing equimolar amounts of the composition 0.2 calcined at 1,050° C. and crushed and the the composition 0.5 calcined at 850° C. and crushed, pressing the mixture, and sintering the pressed mixture at 1,000° C., and having a relative density of 0.92. The curve for the sample No. 4H in FIG. 21 is inserted here, too.

TABLE 6

| Sample No. | Composition ratio $x_1\ x_2$ | Relative density | Dielectric constant ($\epsilon_r$) (20° C.) | Tan δ (%) (20° C.) | Resistivity (Ω · cm) (20° C.) |
|---|---|---|---|---|---|
| 9   | 0.1/0.6 | 0.81 | 7500  | 1.3 | $4.5 \times 10^9$ |
| 9H  | 0.1/0.6 | 0.94 | 9000  | 0.8 | $8.0 \times 10^{10}$ |
| 10  | 0.1/0.7 | 0.75 | 5800  | 2.0 | $1.9 \times 10^{10}$ |
| 10H | 0.1/0.7 | 0.87 | 7000  | 1.4 | $7.0 \times 10^{10}$ |
| 12H | 0.2/0.5 | 0.92 | 14000 | 0.6 | $5.0 \times 10^{11}$ |

Figure 23:
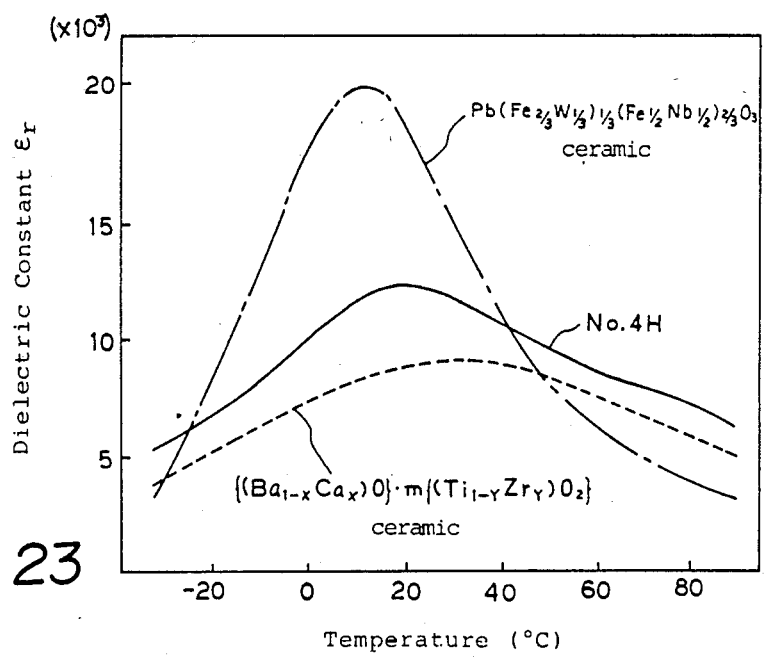
FIG. 23 is a chart showing a comparison in the temperature dependence of dielectric constant between an embodiment of the perovskite ceramic of the present invention and a conventional perovskite ceramic.

FIG. 23 shows a comparison in temperature dependence of dielectric constant $\epsilon_r$ between a ceramic according to the present invention and the conventional ceramics. In FIG. 23, the solid line represents the sample No. 4H highly densified as an embodiment of this invention, and the dot-and-bar line and the broken line represent a $Pb(Fe_{\frac{2}{3}}W_{\frac{1}{3}})_x(Fe_{\frac{1}{2}}Nb_{\frac{1}{2}})_{1-x}O_3$ ceramic (wherein $x=\frac{1}{3}$) and a $\{(Ba_{1-x}Ca_x)O\}\cdot m\{(Ti_{1-y}Zr_y)O_2\}$ ceramic ($1.005 \leq m \leq 1.03$, $0.02 \leq x \leq 0.22$, $0.1 \leq y \leq 0.16$), respectively, which were calcined according to the conventional production process as shown in FIG. 1, and which are used as commercially available capacitor materials. In a comparison of the ceramic according to the present invention with the $Pb(Fe_{\frac{2}{3}}W_{\frac{1}{3}})_{\frac{1}{3}}(Fe_{\frac{1}{2}}Nb_{\frac{1}{2}})_{\frac{2}{3}}O_3$ ceramic, the ceramic according to the present invention has higher values of dielectric constant $\epsilon_r$ at or above 50° C. and a much smaller temperature dependence of dielectric constant though it has a lower peak value of dielectric constant $\epsilon_r$. Thus, the ceramic according to the present invention is advantageous in securing high dielectric constants over a wide temperature range. In a comparison of the ceramic according to present invention with the $\{(Ba_{1-x}Ca_x)O\}\cdot m\{(Ti_{1-y}Zr_y)O_2\}$ ceramic, the ceramic according to the present invention shows higher dielectric constants over all temperature range.

This will suggest that the ceramic according to the present invention may be very advantageous in securing a small temperature dependence of dielectric constant $\epsilon_r$ over a wide temperature range without addition of any depressor agent, as compared with the conventional ceramics. The present invention is applicable to other compositions than the compositions mentioned in the foregoing Examples. Needless to say, the temperature dependence of $\epsilon_r$ can be arbitrarily controlled by a combination of materials to be mixed.

EXAMPLE 5

Discussion will be made about dependence of dielectric constant on the electric field strength for a perovskite mixed-sintering ceramic according to the present invention.

FIG. 24 shows a comparison in electric field strength dependence of dielectric constant at 20° C. between a $Pb(Fe_{\frac{2}{3}}W_{\frac{1}{3}})_x(Fe_{\frac{1}{2}}Nb_{\frac{1}{2}})_{1-x}O_3$ ceramic ($x=\frac{1}{3}$) calcined according to the conventional production process as shown in FIG. 1, which ceramic is used as a commercially available capacitor material, and the mixed-sintering ceramics according to the present invention (sample No. 4H in Table 5 and samples Nos. 9H and 10H in Table 6). Electric field dependence of dielectric constant are expressed in terms of the rate of $\epsilon_r$ change ($|\Delta\epsilon r/\epsilon r0\ kV/mm|$) based on the dielectric constant $\epsilon_r$ ($\epsilon r0\ kV/mm$) in the case of no application of electric field (0 kv/mm). As shown in the figure, the mixed-sintering ceramics according to the present invention all have smaller electric field strength dependences of dielectric constant than that of the conventional ceramic. Also there is shown a tendency that the electric field strength dependence of dielectric constant decreases with an increase in the difference in the value of x between compositions mixed. For example, the value of $|\Delta\epsilon_r/\epsilon_r 0\ kV/mm|$ when an electric field of 1 kV/mm was applied was 80% in the case of the conventional ceramic, 57% in the case of the mixed-sintering ceramic (sample No. 4H) prepared from the compositions with $x_1 0.1$ and $x_2 0.5$, 48% in the case of the mixed-sintering ceramic (sample No. 9H) prepared from the compositions with $x=0.1$ and $x=0.6$, and 37% in the case of the mixed-sintering ceramic (sample No. 10H) prepared from the compositions with $x_1 0.1$ and $x_2 0.7$, thus demonstrating a decreasing trend. Thus, the electric field strength dependence of dielectric constant can be arbitrarily decreased by a combination of compositions mixed. Needless to say, the electric field strength dependence of dielectric constant can be controlled by varying the mixing ratio.

EXAMPLE 6

The perovskite ceramics (mixed-sintering ceramics) according to the present invention as described in Examples 1 to 4 are suitable for use in ceramic dielectric layers of capacitors. In the case of a multilayer ceramic capacitor comprising laminated thin ceramic dielectric layers, crystal grains in the sintered ceramic are desired to be small and uniform. For satisfying such a demand, investigations were made to find a mixed-sintering ceramic having small and non-scattered sizes of crystal grains.

The perovskite is a double oxide represented by a chemical formula: $ABO_3$, in which A constitutes a primitive cubic lattice, B is located in the body-centered position thereof, and O is located in the face-centered position thereof. In order to suppress the growth of crystal grains, a chemically stable metal oxide was added in effecting mixed-sintering of two kinds of perovskite ceramic materials having mutually different Curie temperatures without complete solid solution thereof. Such metal oxide is the oxide of an element incapable of occupying the B position of a perovskite ceramic material $ABO_3$ and has a higher melting point than that of the following perovskite ceramic materials. The influence of the addition was examined.

As an instance, a composition with $x_1=0.1$ (composition 0.1) and a composition with $x_2=0.5$ (composition 0.5) of the $Pb(Fe_{\frac{2}{3}}W_{\frac{1}{3}})x_1(Fe_{\frac{1}{2}}Nb_{\frac{1}{2}})_{1-x_2}O_3$ system where $i=1$ or 2, and $x_1$ does not equal $x_2$ were used as the two kinds of perovskite ceramic materials, and a metal oxide, $Dy_2O_3$, was used for suppressing the growth of grains. The results will be explained.

Figure 25:
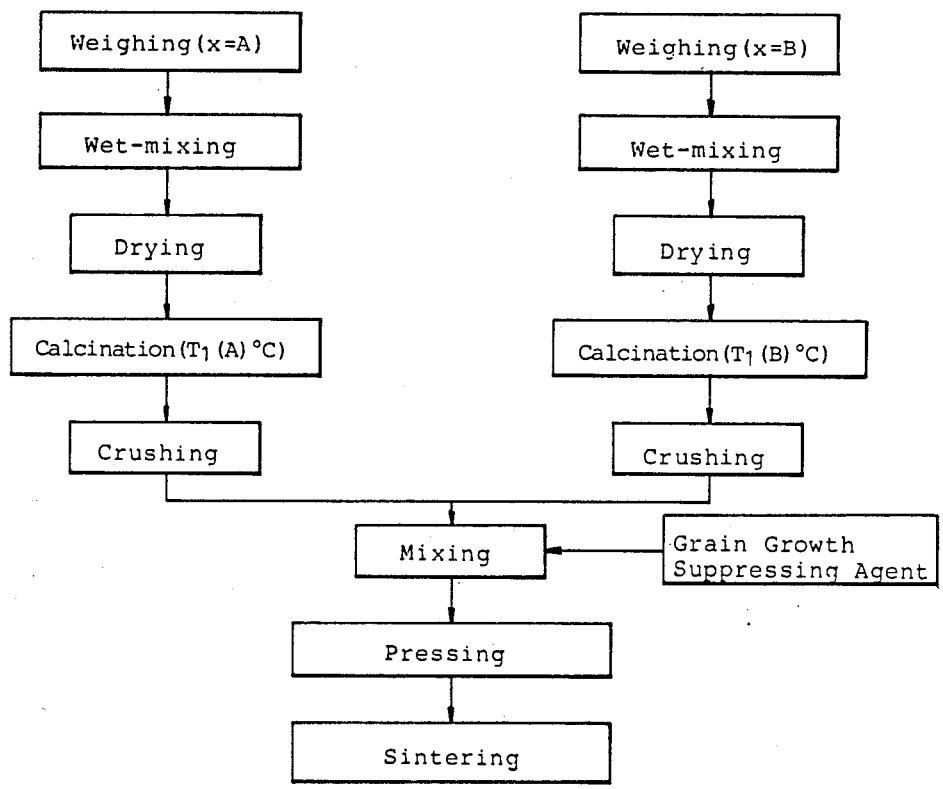
FIG. 25 is a flow chart illustrating another embodiment of the fabrication method of a perovskite ceramic according to the present invention.

FIG. 25 shows the production process. Raw material powders, PbO, $Fe_2O_3$, $WO_3$ and $Nb_2O_3$, were so weighted as to provide values of $x_1$ of 0.1 and $x_2$ of 0.5 as mentioned above to form two compositions followed by separately mixing the compositions together with pure water in a ball mill. After dehydration and drying, the mixtures were respectively calcined in air at 1,050° C. and 850° C. for one hour, followed by crushing in a ball mill. The compositions after the calcination were subjected to a measurement of X-ray diffraction patterns in a range of $2\theta=20$ to 90° by using a CuK$\alpha$ radiation to confirm formation of the desired perovskite ceramic materials. Equimolar amounts of these two kinds of perovskite ceramic materials were mixed, followed by addition of $Dy_2O_3$. The resulting mixture was pressed into a pellet of about 12 mm in diameter and about 0.7 mm in thickness by using a polyvinyl alcohol solution as the binder. The pellet was sintered in air at 1,000° C. for one hour. The sintered surface of the sintering ceramic was observed by an electron microscope (magnification: x 1,000) to measure the average grain size (Martin diameter) of crystal grains. Silver was electroded on both surfaces of the sintering surface. As to the dielectric properties, the dielectric constant $\epsilon_r$ was measured at 1 kHz in a temperature range of $-40°$ to 120° C.

Figure 26:
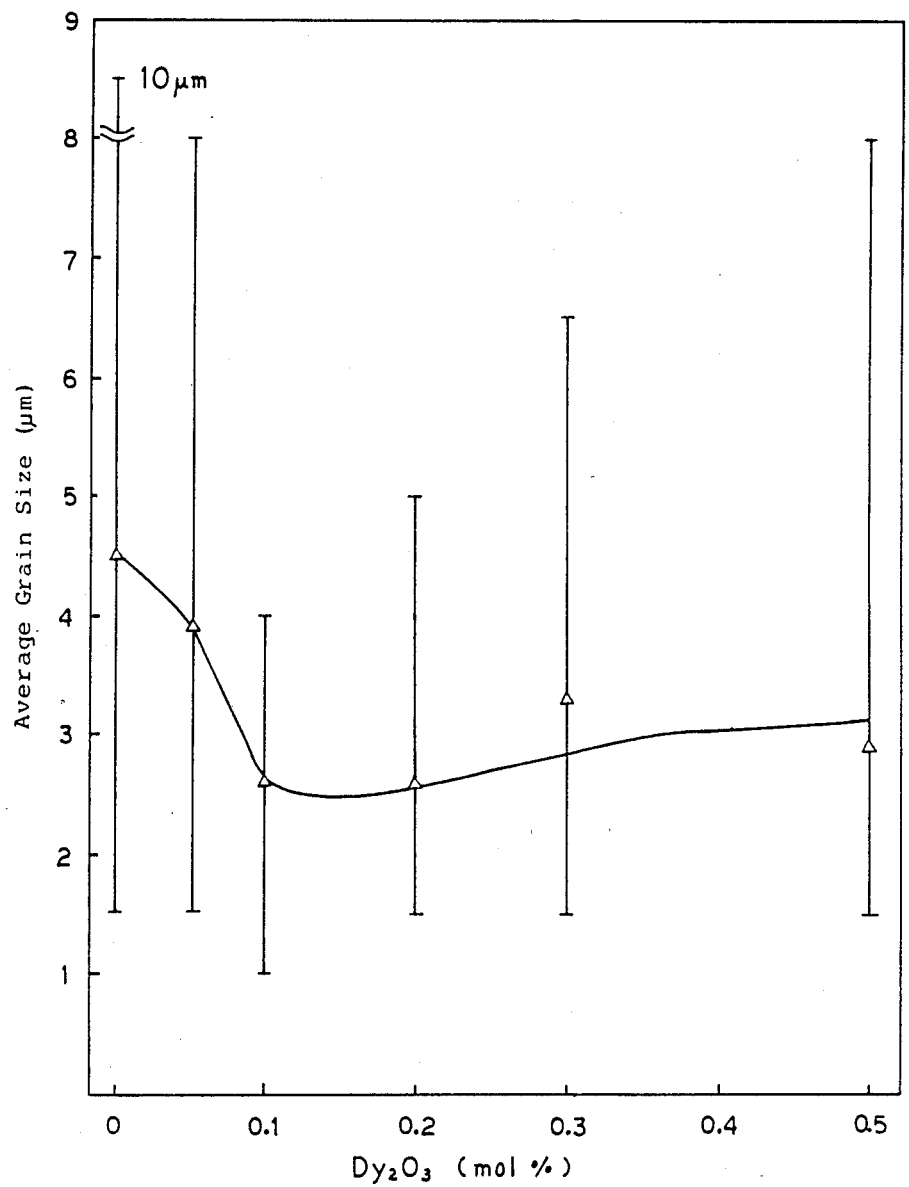
FIG. 26 is a chart showing a variation of crystal grain size with the amount of $Dy_2O_3$ added as to an embodiment of the perovskite ceramic of the present invention.

FIG. 26 shows the relationship between the amount of $Dy_2O_3$ added and the average grain size and the grain size deviation of crystal grains of the ceramic. The amount of $Dy_2O_3$ added is expressed in terms of mol % based on the mixture of the materials, the composition 0.1 and the composition 0.5. The number of crystal grains measured was 20. As shown in the figure, as the amount of $Dy_2O_3$ added is increased to 0.1 mol %, the average grain size of crystal grains decreases to 2.6 $\mu$m, which is about $\frac{1}{2}$ an average grain size of 5.0 $\mu$m in the case of the ceramic having no $Dy_2O_3$ added, and the grain size deviation considerably dwindles to 1 to 4 $\mu$m as against 1.5 to 10 $\mu$m as the grain size deviation of the ceramic having no $Dy_2O_3$ added. However, as the amount of $Dy_2O_3$ added exceeds 0.2 mol %, the average grain size and the grain size deviation increases. Thus, it is understood that the effect is remarkable in suppression of the growth of grains when $D_2O_3$ is added in an amount within a range of 0.1 to 0.2 mol %.

Figure 27:
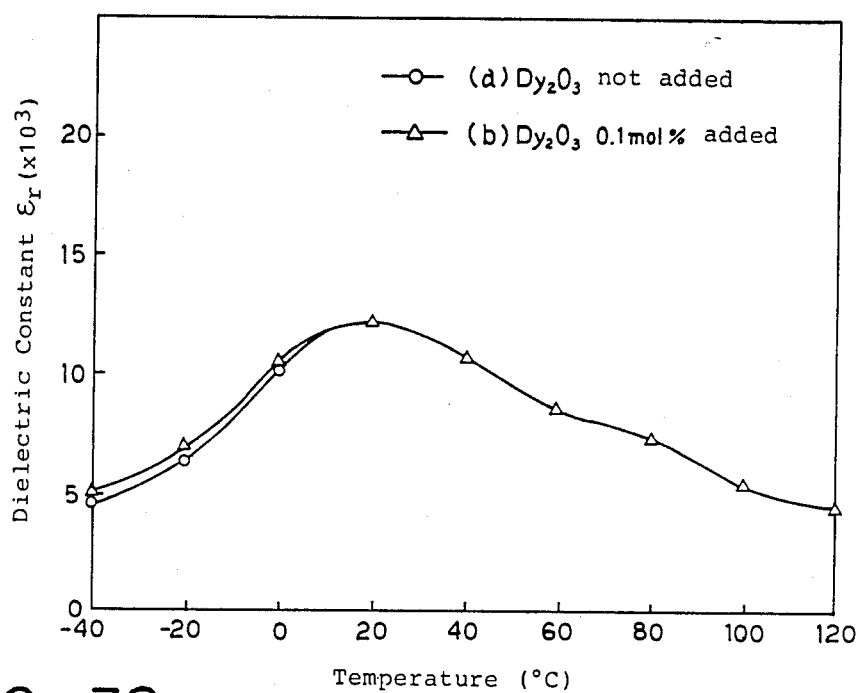
FIG. 27 is a chart showing the influence of addition of $Dy_2O_3$ on the temperature dependence of dielectric constant.

FIG. 27 shows the temperature dependences of dielectric constant for the mixed-sintering ceramics without $Dy_2O_3$ addition and with 0.1 mol % of $Dy_2O_3$ added. In the figure, the curve (a) is for the ceramic having no $Dy_2O_3$ added and the curve (b) is for the ceramic having 0.1 mol % of Dy2O3 added.

If substitution of other metal ions for B in the positions of B occurs in the perovskite ceramic material ($ABO_3$), the Curie temperature changes and the peak of dielectric constant observed in the temperature dependence of dielectric constant shifts. However, in a comparison in the temperature dependence of dielectric constant between the mixed-sintering ceramic having no $Dy_2O_3$ added and the mixed-sintering ceramic having 0.1 mol % of Dy2O3 added as shown in FIG. 27, weak peaks of dielectric constant appeared at 20° C. and 80° C. in either case of the ceramics, and no shift of peaks could be observed. Furthermore, the addition of $Dy_2O_3$ did not spoil the dielectric constant and the flatness of temperature dependence of dielectric constant. Therefore, it is believed that $Dy_2O_3$ added may not be diffused into crystal grains of the composition 0.1 and 0.5 as the perovskite ceramic materials but exist mainly in the grain boundaries to exert only a grain growth-suppressing effect.

Figure 28:
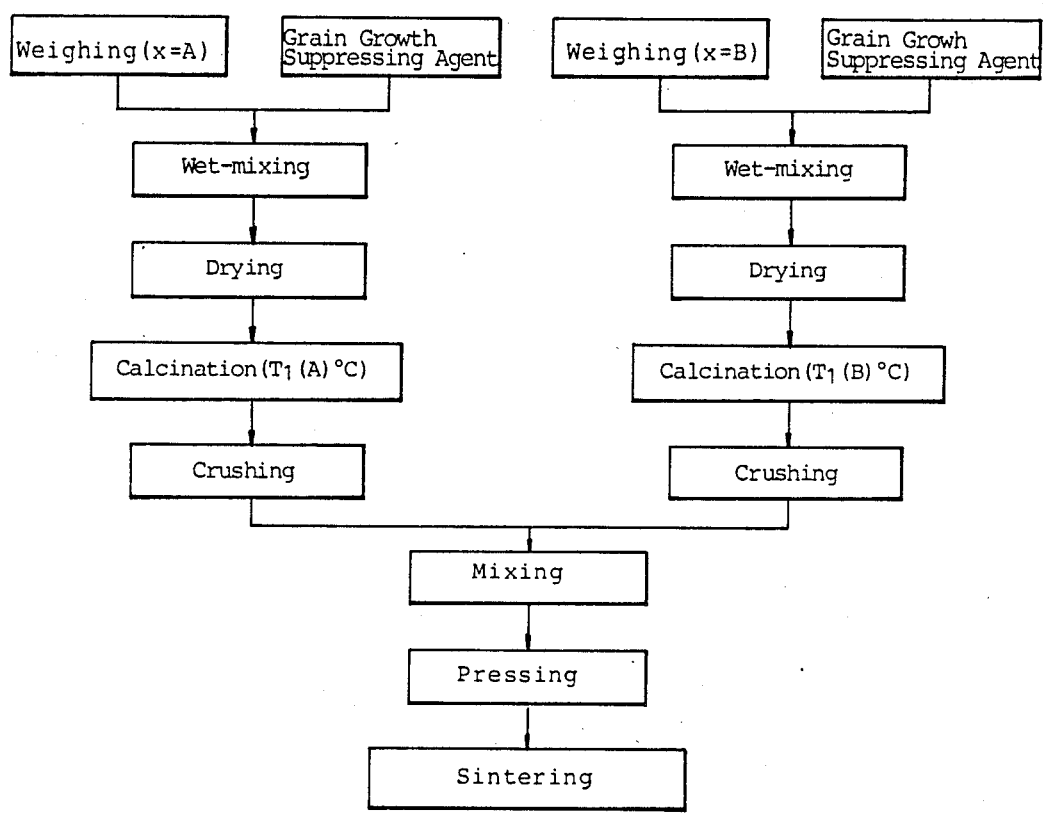
FIG. 28 is a flow chart showing still another embodiment of the fabrication method of a perovskite ceramic according to the present invention.

In this Example, the method was explained which comprises separately calcining ceramic materials to be mixed, crushing the calcined materials, mixing the crushed materials at a desired molar ratio while, at the same time, adding a metal oxide capable of suppressing the growth of crystal grains (for example, $Dy_2O_3$), and sintering the mixture. Alternatively as shown in FIG. 28, however, the same effect as mentioned above can be obtained even according to a method comprising adding a metal oxide capable of suppressing the growth of crystal grains (for example, $Dy_2O_3$) in the course of weighing raw materials, followed by calcining, crushing, mixing at a desired molar ratio, pressing and sintering. Further alternatively, the same effect can be obtained by adding a metal oxide capable of suppressing the growth of crystal grains to only the perovskite ceramic material showing a high rate of crystal growth during sintering (composition 0.5 in this Example).

The oxide to be added is required, for avoiding spoiling the dielectric properties of the ceramic material, to be incapable of solid soluting into the perovskite ceramic material during sintering, particularly to be an oxide of a metal element incapable of substituting for an atom in the position of B (body-centered position) in a general formula: $ABO_3$. Further, the presence of the oxide in the grain boundaries without substantial solid solution thereof into the perovskite ceramic material is effective for suppressing the growth of crystal grains. In this respect, a chemically stable oxide having a higher melting point than that of the perovskite ceramic materials is effective. As an example of such an oxide, $Dy_2O_3$ (melting point: 2,375° C.) has been mentioned. $Gd_2O_3$ (melting point: 2,395° C.) and $Sm_2O_3$ (melting point: 2,250° C.) can exert the same effect, too.

Needless to say, the methods as described above can be applied to the case where three or more kinds of mutually different perovskite ceramic materials are mixed and sintered.

EXAMPLE 7

A multilayer ceramic capacitor was produced which uses a ceramic comprising two or more kinds of perovskite ceramic material having mutually different Curie temperatures and coexisting without complete solid solution thereof in a ceramic dielectric layer of the capacitor.

Figure 29:
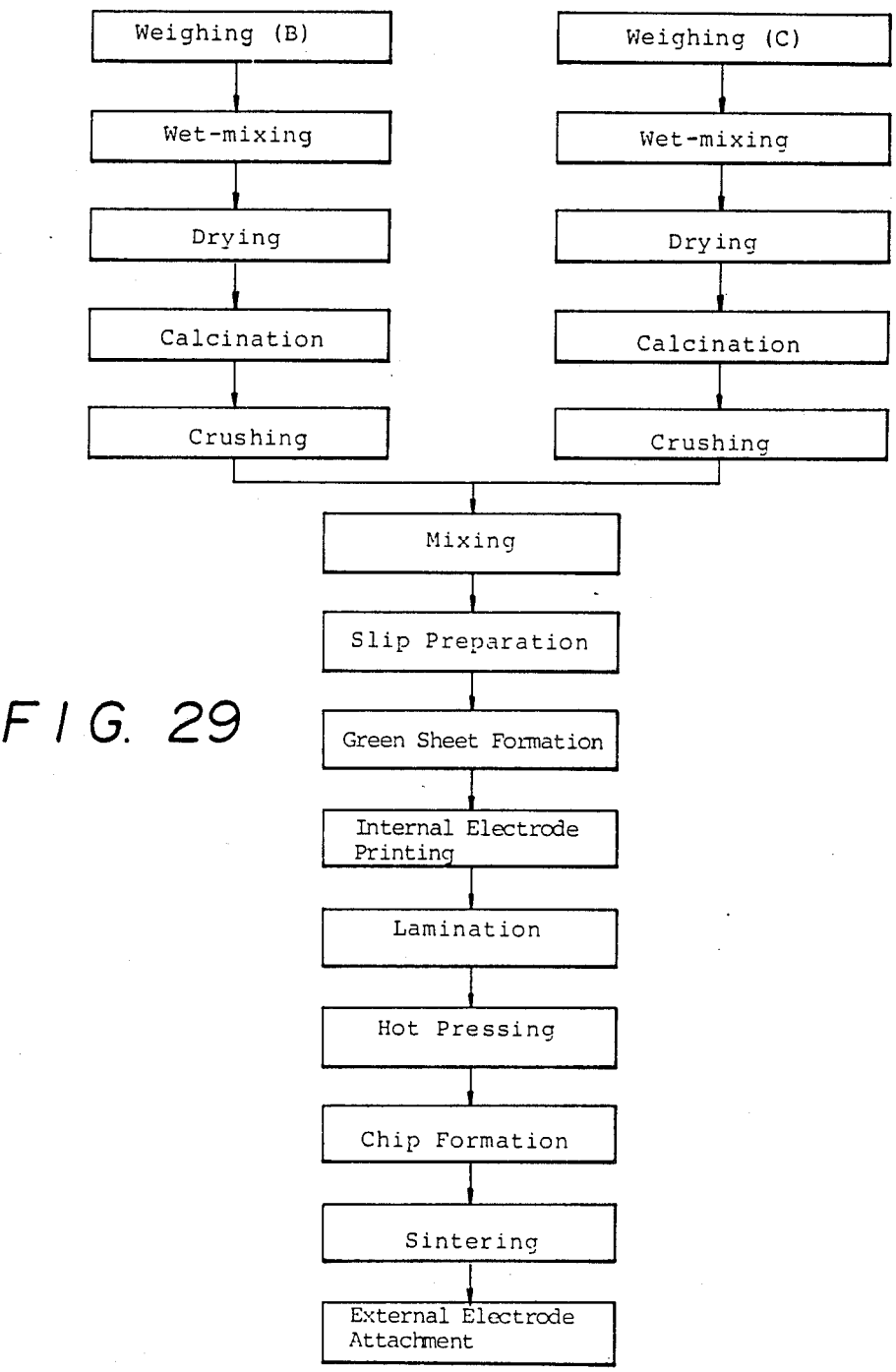
FIG. 29 is a flow chart showing an embodiment of the fabrication method of a multilayer ceramic capacitor according to the present invention.
Figure 30:
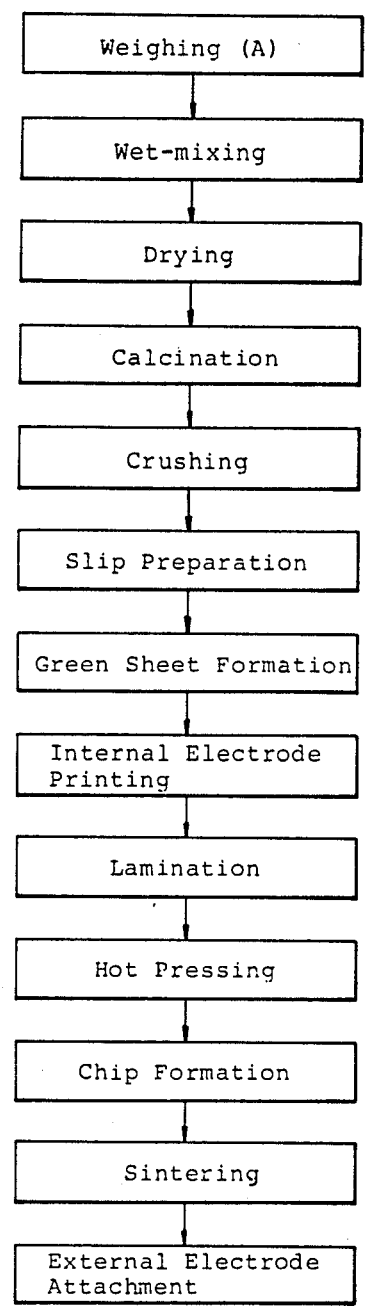
FIG. 30 is a flow chart of a conventional fabrication method of a multilayer ceramic capacitor.

A case will now be described where a multilayer ceramic capacitor having a capacity of 10 μF was produced using a ceramic composed of an equimolar mixture of a composition with $x_1=0.2$ (composition 0.2) and a composition with $x_1=0.5$ (composition 0.5) in the $Pb(Fe_{\frac{2}{3}}W_{\frac{1}{3}})_x(Fe_{\frac{1}{2}}Nb_{\frac{1}{2}})_{1-x}O_3$ system. The production process was as shown in FIG. 29. The steps ranging from weighing to crushing in the process were divided into two lines of the corresponding steps and a step of mixing the crushed materials was added, as different from a conventional process of producing a multilayer ceramic capacitor as shown in FIG. 30. More specifically, two or more kinds of raw material powders of perovskite ceramic materials having mutually different compositions are separately calcined at mutually different temperatures to form two or more kinds of perovskite ceramic materials. These materials are then crushed and mixed at an adequate ratio.

Figure 31:
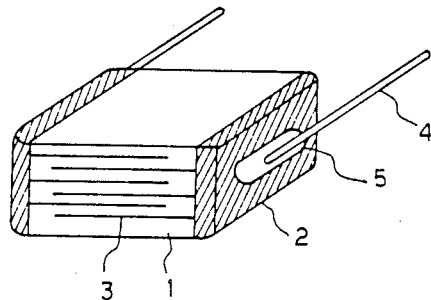
FIG. 31 is a perspective view of an embodiment of the multilayer ceramic capacitor of the present invention.

Specifically, powders of PbO, $Fe_2O_3$, $WO_3$ and $Nb_2O_3$ are weighed in such amounts as to provide compositions 0.2 and 0.5, and subjected to wet-mixing, dehydration, and drying. These steps may be practiced according to the conventional process. The material of the composition 0.2 is calcined in air at 1,050° C. for one hours, while the material of the composition 0.5 is calcined in air at 850° C. for one hour. The calcined materials are crushed and mixed together in equimolar amounts. If needed, a usual binder and/or a dispersant may be added. The resulting mixture is formed into a green sheet having a thickness of 25 μm in the same manner as in the case of a commercially available multilayer ceramic capacitor. For example, an internal electrode consisting of an Ag 80%-Pd 20% alloy is printed on the sheet, followed by lamination and pressing and cutting at a certain chip size. Thereafter, the resulting laminate chip is so sintered in air at 1,000° C. for one hour that two or more kinds of perovskite ceramic materials can coexist. The layer thickness after the sintering is 20 μm. Thereafter, an external electrode is attached to the laminate chip to produce a multilayer ceramic capacitor as shown in FIG. 31, which includes a ceramic dielectric layer 1, the external electrode 2, the internal electrode 3, a lead wire 4, a solder 5 connecting the external electrode with the lead wire.

Figure 32:
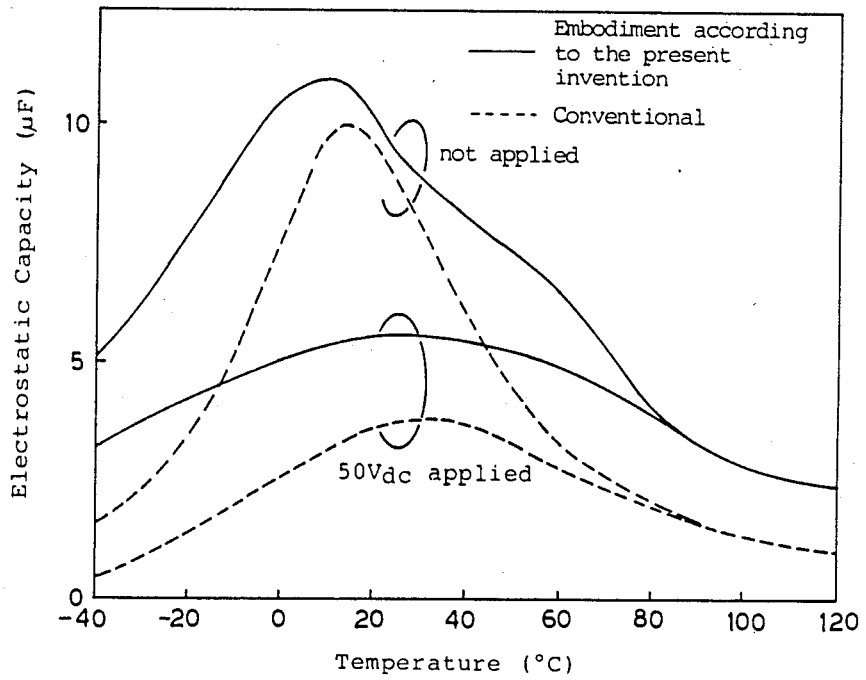
FIG. 32 is a chart showing a comparison of the dependency of electrostatic capacity on the temperature between an embodiment of the multilayer ceramic capacitor of the present invention and a conventional multilayer ceramic capacitor.

FIG. 32 shows a comparison in dielectric properties between the capacitor according to the above-mentioned embodiment of the present invention and a commercially available ceramic capacitor (10 μF) using a ceramic of $x=\frac{1}{3}$ produced according to a conventional process.

The dielectric properties of the ceramic used in the capacitor according to the present invention are flattened in the form of overlapped properties of the perovskite ceramic materials prepared from the respective compositions 0.2 and 0.5 to decrease the temperature dependence of electrostatic capacity. For example, in the case of a service involving 3 μF or more, the service temperature range of the capacitor according to the present invention expands to about two times (from $-25°\sim65°$ C. to $-65°\sim100°$ C.) that of the commercially available ceramic capacitor in the case of no application of voltage, and to about three times (from $5°\sim55°$ C. to $-45°\sim100°$) that of the commercially available ceramic capacitor in the case of application of 50 Vdc. On the other hand, in the case of a service involving a service temperature range of $-25°$ to 80° C. and a voltage of 50 Vdc, the capacitor according to the present invention can provide an electrostatic capacity of three times or more (3 μF or more) that of the commercially available ceramic capacitor, and decrease the rate of change in the electrostatic capacity with the temperature ($\Delta C/C_{20°C}$) to $\frac{1}{2}$ or less that of the commercially available conventional ceramic capacitor (from 79% to 36%). Therefore, the multilayer ceramic capacitor according to the present invention can keep large capacities over a wider temperature range than that of the conventional capacitor, and diminish that dependences of electrostatic capacity on the temperature and the electric field strength.

EXAMPLE 8

The same two kinds of perovskite ceramic materials as in Example 7 were calcined, crushed, and mixed with addition of 0.1 mol % of $Dy_2O_3$, based on the whole amount of the mixed perovskite ceramic material. Thereafter, a multilayer ceramic capacitor was prepared in the same manner as in Example 7. As shown in FIG. 26, the addition of $Dy_2O_3$ reduced the average grain size of ceramic crystal grains after sintering to as small a size as 2.6 μm, and made the scattering of grain sizes smaller, which are favorable for formation of a multilayer ceramic capacitor. However, when the amount of $Dy_2O_3$ added exceeds 0.2 mol %, the scattering of grain sizes becomes unfavorably large.

Addition of 0.1 to 0.2 mol % of $Dy_2O_3$ did not cause changes, in electrostatic capacity, temperature dependence of electrostatic capacity, and voltage dependence of electrostatic capacity, of the multilayer ceramic capacitor.

The oxide to be added is not limited to $Dy_2O_3$, and may be a chemically stable oxide of a high melting point, the metal atoms of which are incapable of substituting for atoms located in the body-centered positions in a perovskite ceramic material, and which is to be present in the crystal grain boundaries of a perovskite ceramic.

The case where two kinds of the $Pb(Fe_{\frac{2}{3}}W_{\frac{1}{3}})_x(Fe_{\frac{1}{2}}Nb_{\frac{1}{2}})_{1-x}O_3$ system, the compositions 0.2 and 0.5, were mixed has been illustrated as an example. However, with use of a ceramic dielectric prepared by sintering a mixture of three or more kinds of perovskite ceramic materials having mutually different compositions in such a way as to allow them to coexist in the sinter without complete solid solution thereof, a multilayer ceramic capacitor having small temperature and voltage dependences of electrostatic capacity can be obtained.

A multilayer ceramic capacitor of a lead-attached type is shown as an embodiment of the present invention in FIG. 31. Besides the lead-attached type, however, not only a chip type but also a structure of a multilayer ceramic capacitor covered with a resin (a mold type and a dip type) and a structure having a changed form of a lead (a plug-in type and a ribbon lead type) can be, needless to say, adopted as the type of the multilayer ceramic capacitor of the present invention.

The $Pb(Fe_{\frac{2}{3}}W_{\frac{1}{3}})_x(Fe_{\frac{1}{2}}Nb_{\frac{1}{2}})_{1-x}O_3$ system has hereinbefore been discussed as a representative example of the perovskite ceramic material. However, the present invention can apply to two or more kinds of perovskite ceramic materials differing in x which are chosen from among binary perovskite ceramic materials such as $xPb(Fe_{\frac{1}{2}}Nb_{\frac{1}{2}})O_3$—$(1-x)Pb(Mg_{\frac{1}{3}}Nb_{\frac{2}{3}})O_3$,
$xPb(Mg_{\frac{1}{3}}Nb_{\frac{2}{3}})O_3$—$(1-x)PbTiO_3$, and
$xBaTiO_3$—$(1-x)PbTiO_3$, and two or more kinds of perovskite ceramic materials differing in composition ratio (x, y, z) which are chosen from among ternary perovskite ceramic materials such as $Pb(Zn_{\frac{1}{3}}Nb_{\frac{2}{3}})_x(Fe_{\frac{2}{3}}W_{\frac{1}{3}})_y(Fe_{\frac{1}{2}}Nb_{\frac{1}{2}})_zO_3$ (provided that $x+y+z=1$). The requisite in this case is that the two or more kinds of perovskite ceramic materials differing in composition ratio have respective high dielectric constants and mutually different Curie temperatures.

POSSIBLE APPLICATIONS IN THE INDUSTRY

As explained in detail, the perovskite ceramic according to the present invention can enjoy not only an effective combination of temperature dependences of dielectric constant for respective mixed materials but also an effective reduction of dependence of dielectric constant on the electric field strength by virtue of a mixture of the perovskite ceramic materials having respective high dielectric constants and mutually different Curie temperatures. Furthermore, the ceramic of the present invention has a high dielectric constant, a relatively small dielectric loss tangent, and a high resistivity. Accordingly, it is advantageous in that the dependences of dielectric constant on the temperature and the electric field strength are small in a wide temperature range even without containment of any depressor agent added. Moreover, since the ceramic of this invention can be prepared by calcination at 1,000° C. or a lower temperature, a cheap furnace material can be used in a sintering furnace, and the energy for calcination and sintering may be small. Thus, the ceramic of this invention has large industrial merits.

Addition of a metal oxide capable of suppressing the growth of crystal grains, such as $Dy_2O_3$, is advantageous in that the crystal grain size can be reduced with a small deviation of grain size without spoiling the dielectric properties characteristic of the ceramic comprising two or more kinds of perovskite ceramic materials coexisting therein. Therefore, when a ceramic containing such a metal oxide added thereto is used as a material for a multilayer ceramic capacitor, a ceramic dielectric layer advantageously can be thin with few defects such as pinholes.

Use of the ceramic of the present invention comprising two or more kinds of perovskite ceramic materials coexisting therein and having respective high dielectric constants and mutually different Curie temperatures as the ceramic dielectric layer of a multilayer ceramic capacitor is advantageous in that large capacities can be secured over a wider temperature range with small dependences of electrostatic capacity on the temperature and the voltage than those of conventional multilayer ceramic capacitors. Therefore, use of the capacitor according to the present invention in an environment involving fluctuation of temperature and/or application of voltage is advantageous. For example, a power source device for mounting on a stationary artificial satellite is exposed to periodically fluctuating temperatures between $-20°$ and $50°$ C. in the service environment and subjected to voltage application. Use of the capacitor according to the present invention in a filter circuit in such a device is advantageous in that a high stability can be materialized in the power source devices, and that the number of capacitors to be used can be decreased by a number which can be compensated by a decrease in the dependences of electrostatic capacity on the temperature and the voltage, leading to reduction of the mounting area and reduction of the weight as well as economizing.

We claim:

1. A perovskite ceramic comprising two kinds of perovskite ceramic materials having respective high dielectric constants and mutually different Curie temperatures coexisting therein without forming a complete solid solution thereof, said two kinds of perovskite ceramic materials having the formula $Pb(Fe_{\frac{2}{3}}W_{\frac{1}{3}})_{x_i}(Fe_{\frac{1}{2}}Nb_{\frac{1}{2}})_{1-x_i}O_3$, wherein in a first kind of perovskite ceramic material $i=1$ and $0.1 \leq x_i \leq 0.2$, and in a second kind of ceramic perovskite material $i=2$ and $0.5 \leq x_2 \leq 0.9$, said two kinds of perovskite ceramic material coexisting in the mixing ration $0.5 \leq x_2/(x_1+x_2) \leq 0.8$.

2. A perovskite ceramic as claimed in claim 1 wherein said two kinds of perovskite ceramic materials coexisting in the ceramic without forming a complete solid solution thereof constitute a ceramic prepared by separately preliminarily calcining raw material powders of two or more kinds of perovskite ceramic materials having mutually different compositions to form two or more kinds of perovskite ceramic materials having mutually different Curie temperatures, crushing said materials formed, mixing the crushed materials at an adequate ratio, and sintering the mixture without complete solid solution thereof.

3. A perovskite ceramic as claimed in claim 2 wherein the calcining temperature of at least one kind of said two kinds of perovskite ceramic materials is the same as or higher than the sintering temperature of said mixture of the perovskite ceramic materials.

4. A perovskite ceramic as claimed in claim 1 wherein the dielectric constants of said two kinds of perovskite ceramic materials at normal temperatures each independently is 1,000 or more.

5. A perovskite ceramic as claimed in claim 1 characterized in that a minute amount of an oxide which is an oxide of a metal element incapable of substituting for atoms occupying the body-centered position of crystal lattices of said two kinds of perovskite ceramic materials, and which has a higher melting point than the melting points of said perovskite ceramic materials is added to said perovskite ceramic materials.

6. A perovskite ceramic as claimed in claim 5 wherein said oxide is selected from the group consisting of $Dy_2O_3$, $Gd_2O_3$, and $Sm_2O_3$.

7. A process for preparing a perovskite ceramic wherein two kinds of perovskite ceramic materials coexist, comprising the steps of:

weighing and mixing raw material powders including PbO, $Fe_2O_3$, $WO_3$ and $Nb_2O_5$ to provide a first mixture having the composition $Pb(Fe_{\frac{2}{3}}W_{\frac{1}{3}})_{x_1}(Fe_{\frac{1}{2}}NB_{\frac{1}{2}})_{1-x_1}O_3$, wherein $0.1 \leq x_1 \leq 0.2$;

calcinating said first mixture;

crushing the resultant first perovskite ceramic material;

weighing and mixing raw material powders including PbO, $Fe_2O_3$, $WO_3$ and $Nb_2O_5$ to provide a second mixture having the composition $Pb(Fe_{\frac{2}{3}}W_{\frac{1}{3}})_{x_2}(Fe_{\frac{1}{2}}Nb_{\frac{1}{2}})_{1-x_2}O_3$, wherein $0.5 \leq x_2 \leq 0.9$;

calcinating said second mixture:

crushing the resultant second perovskite ceramic material;

mixing said first perovskite ceramic material and said second perovskite ceramic material in the ratio $0.5 \leq x_2/(x_1+x_2) \leq 0.8$;

pressing the mixed first and second perovskite ceramic materials into pellets; and
sintering said pellets without forming a complete solid solution of said first and second perovskite ceramic materials.

8. A process for preparing a perovskite ceramic as claimed in claim 7 wherein the calcining temperature of at least one kind of said two kinds of perovskite ceramic materials is the same as or higher than the sintering temperature of said mixed perovskite ceramic materials.

9. A process for preparing a perovskite ceramic as claimed in claim 7 wherein the dielectric constants of said two kinds of perovskite ceramic materials at normal temperatures each independently are 1,000 or more.

10. A process for preparing a perovskite ceramic as claimed in claim 7 wherein a minute amount of an oxide which is an oxide of a metal element incapable of substituting for atoms occupying the body-centered positions of crystal lattices of said two or more kinds of perovskite ceramic materials, and which has a higher melting point than the melting points of said perovskite ceramic materials is added to said perovskite ceramic materials.

11. A process for preparing a perovskite ceramic as claimed in claim 10 wherein said oxide is kind selected from the group consisting of $Dy_2O_3$, $Gd_2O_3$ and $Sm_2O_3$.

12. A perovskite ceramic capacitor comprising two kinds of perovskite ceramic materials having respective high dielectric constants and mutually different Curie temperatures coexisting therein without forming a complete solid solution thereof, said two kinds of perovskite ceramic materials having the formula $Pb(Fe_{\frac{2}{3}}W_{\frac{1}{3}})_{x1}(F_{\frac{1}{2}}Nb_{\frac{1}{2}})_{1-xi}O_3$, where in a first kind of perovskite ceramic material $i=1$ and $0.1 \leq x_1 \leq 0.2$, and in a second kind of ceramic perovskite material $i=2$ and $0.5 \leq x_2 \leq 0.9$, said two kinds of perovskite ceramic material coexisting in the mixing ration $0.5 \leq x_2/(x_1+x_2) \leq 0.8$.

13. A perovskite ceramic capacitor as claimed in claim 12 wherein the dielectric constants of said two kinds of perovskite ceramic materials at normal temperatures each independently is 1,000 or more.

14. A perovskite ceramic capacitor as claimed in claim 12 wherein a minute amount of an oxide which is an oxide of a metal element incapable of substituting for atoms occupying the body-centered positions of crystal lattices of said two or more kinds of perovskite ceramic materials, and which has a higher melting point than the melting points of said perovskite ceramic materials is added to said perovskite ceramic materials.

15. A perovskite ceramic capacitor as claimed in claim 14 wherein said oxide is selected from the group consisting of $Dy_2O_3$, $Gd_2O_3$ and $Sm_2O_3$.

* * * * *